US010759482B2

(12) United States Patent
Shibuya et al.

(10) Patent No.: US 10,759,482 B2
(45) Date of Patent: Sep. 1, 2020

(54) OPEN-CABIN VEHICLE

(71) Applicant: YAMAHA HATSUDOKI KABUSHIKI KAISHA, Iwata-shi, Shizuoka (JP)

(72) Inventors: Hiroshi Shibuya, Iwata (JP); Kotaro Onishi, Iwata (JP); Tomohiro Takeuchi, Iwata (JP)

(73) Assignee: YAMAHA HATSUDOKI KABUSHIKI KAISHA, Iwata-Shi, Shizuoka (JP)

(*) Notice: Subject to any disclaimer, the term of this patent is extended or adjusted under 35 U.S.C. 154(b) by 0 days.

(21) Appl. No.: 16/591,036

(22) Filed: Oct. 2, 2019

(65) Prior Publication Data

US 2020/0031415 A1 Jan. 30, 2020

Related U.S. Application Data

(63) Continuation of application No. PCT/JP2018/014218, filed on Apr. 3, 2018.

(30) Foreign Application Priority Data

Apr. 13, 2017 (JP) .................. 2017-079915

(51) Int. Cl.
*B60R 25/10* (2013.01)
*B62H 5/20* (2006.01)
(Continued)

(52) U.S. Cl.
CPC ............ *B62H 5/20* (2013.01); *B60R 25/241* (2013.01); *B62H 5/04* (2013.01); *G07C 9/00309* (2013.01);
(Continued)

(58) Field of Classification Search
CPC .......... B62H 5/20; B62H 5/04; B60R 25/241; B60R 2325/205; B60R 2325/306; G07C 9/00309; G07C 2209/63
See application file for complete search history.

(56) References Cited

U.S. PATENT DOCUMENTS

2002/0025823 A1  2/2002  Hara
2004/0104815 A1  6/2004  Suyama et al.
(Continued)

FOREIGN PATENT DOCUMENTS

DE     10064141 A1   7/2002
EP      1184236 A2   3/2002
(Continued)

OTHER PUBLICATIONS

Taiwan Patent Office, Office Action, Patent Application Serial No. TW107112536, dated Jan. 18, 2019.

*Primary Examiner* — Phung Nguyen
(74) *Attorney, Agent, or Firm* — Rabin & Berdo, P.C.

(57) ABSTRACT

An open-cabin vehicle is provided that makes it possible to enjoy the convenience provided by electronic devices while suppressing electric power consumption and also suppressing a reduction in the convenience of the open-cabin vehicle. An identification signal transmission unit inside an electric power control apparatus of an open-cabin vehicle intermittently transmits an identification signal (ID). A response signal reception unit receives a response signal (RE) that is transmitted from a portable terminal in response to the identification signal (ID) without any operation by a rider on the portable terminal or the open-cabin vehicle. When the response signal reception unit receives the response signal (RE), a command unit commands current conduction in a first electric power supply circuit and does not command current conduction in a second electric power supply circuit.

4 Claims, 11 Drawing Sheets

(51) Int. Cl.
*B60R 25/24* (2013.01)
*B62H 5/04* (2006.01)
*G07C 9/00* (2020.01)

(52) U.S. Cl.
CPC ... *B60R 2325/205* (2013.01); *B60R 2325/306* (2013.01); *G07C 2209/63* (2013.01)

(56) References Cited

U.S. PATENT DOCUMENTS

| | | | |
|---|---|---|---|
| 2010/0075656 A1 | 3/2010 | Howarter et al. | |
| 2015/0298628 A1* | 10/2015 | Amano | B60Q 1/0088 |
| | | | 307/9.1 |
| 2017/0101076 A1* | 4/2017 | Krishnan | E05B 81/78 |
| 2017/0253216 A1* | 9/2017 | Nishidai | B60R 25/241 |
| 2018/0050662 A1* | 2/2018 | Sanji | H04B 17/318 |
| 2019/0295349 A1* | 9/2019 | Kim | B60R 25/245 |

FOREIGN PATENT DOCUMENTS

| | | |
|---|---|---|
| EP | 1839947 A1 | 10/2007 |
| EP | 1886885 A2 | 2/2008 |
| JP | 2001-148657 A | 5/2001 |
| JP | 2002-077972 A | 3/2002 |
| JP | 2004-025938 A | 1/2004 |
| JP | 2007-081673 A | 3/2007 |
| JP | 2011-020634 A | 2/2011 |
| JP | 2014-043167 A | 3/2014 |

\* cited by examiner

OPEN-CABIN VEHICLE

CROSS-REFERENCE TO RELATED APPLICATIONS

This application is a continuation of International Application PCT/JP2018/014218 filed on Apr. 3, 2018, which claims priority from Japanese Patent Application No. 2017-079915 filed on Apr. 13, 2017. The contents of each of the identified applications are entirely incorporated herein by reference.

BACKGROUND

Technical Field

The present teaching relates to an open-cabin vehicle whose riding area is not an enclosed space.

Background Art

A navigation system device, an audio player device, a PDA (Personal Digital Assistant), a communication system device and the like have been proposed as electronic devices to be mounted in an open-cabin vehicle.

For example, in Japanese Patent Application Publication No. 2001-148657 (Patent Literature 1), technology in which a communication system is mounted in the helmet of a rider of a motorcycle is proposed. Further, in Japanese Patent Application Publication No. 2014-43167 (Patent Literature 2), technology in which a PDA is mounted in a motorcycle is proposed. The convenience for a rider of the open-cabin vehicle is increased by mounting these electronic devices.

When such electronic devices are mounted in an open-cabin vehicle, attention is given to suppressing electric power consumption. This is because the capacity of an electric power source (e.g., a battery) of an open-cabin vehicle is small in comparison to the electric power source of an automobile. In Japanese Patent Application Publication No. 2007-81673 (Patent Literature 3), technology is proposed that relates to reducing electric power consumption when employing a communication system in a two-wheeled vehicle.

CITATION LIST

Patent Literature

Patent Literature 1: Japanese Patent Application Publication No. 2001-148657
Patent Literature 2: Japanese Patent Application Publication No. 2014-43167
Patent Literature 3: Japanese Patent Application Publication No. 2007-81673

Thus, in the case of mounting an electronic device as described above in an open-cabin vehicle, there is a need to increase convenience while suppressing electric power consumption. However, it is known that when an electronic device such as a navigation system is introduced into an open-cabin vehicle to improve convenience, the original convenience of the open-cabin vehicle decreases.

An open-cabin vehicle is a vehicle that is not provided with a door beside a seat. Therefore, in comparison to an automobile such as an ordinary passenger car, it is not necessary for a rider to open and close a door when getting onto the open-cabin vehicle. Therefore, in comparison to an automobile, the operations that a rider performs when getting onto an open-cabin vehicle are fewer, and the time taken until the vehicle starts to move (that is, until entering a travel-enabled state) can be shortened. This is one advantage of an open-cabin vehicle.

However, as described above, in a case where an electronic device is mounted in an open-cabin vehicle, the electronic device is activated after a rider gets on the open-cabin vehicle and turns on a main switch of the open-cabin vehicle to thereby activate an electric power source. In this case, a certain period of time is taken until the electronic device starts up and enters a usable state (hereinafter, referred to as "normal state"). Therefore, in a case where an electronic device is mounted in an open-cabin vehicle, a rider must wait until the electronic device enters a normal state after the rider gets on the open-cabin vehicle. Consequently, the convenience that is one of the advantages of an open-cabin vehicle, that is, the time period from getting on the open-cabin vehicle until entering a travel-enabled state can be shortened, is diminished.

SUMMARY OF THE INVENTION

Therefore, an object of the present teaching is to provide an open-cabin vehicle that makes it possible to enjoy the convenience provided by electronic devices while suppressing electric power consumption and also suppressing a reduction in the convenience of the open-cabin vehicle.

The present inventors first conducted studies relating to increasing the start-up speed of electronic devices in order to cause the electronic devices to enter a normal state at an early stage, so that the convenience of an open-cabin vehicle would not decrease.

Even when an open-cabin vehicle is in a travel-disabled state (that is, a state in which a driving force control apparatus is not in a normal state), the electronic devices can start up at an early stage to the extent that each electronic device is in a standby state (that is, a state in which an electric current is being fed thereto). However, in such a case, the electric power consumption increases. There is thus the possibility that the electric power source (e.g., a battery) of the open-cabin vehicle will be exhausted at an early stage. As described above, the electric power source capacity of an open-cabin vehicle is much smaller than the electric power source capacity of an automobile. Accordingly, keeping electronic devices in a standby state is not preferable from the viewpoint of electric power consumption.

Therefore, the present inventors had the idea that, if a rider can start activation of electronic devices away from the open-cabin vehicle before the open-cabin vehicle enters a travel-enabled state, a time period (preparation time period) from when the rider approaches the open-cabin vehicle until the rider gets on the open-cabin vehicle can be utilized as an activation time period of the electronic devices.

With a provision of a remote control for each electronic device, the rider can activate the respective electronic devices from a remote location. However, in this case the rider must have operated the remote control for the electronic device by the time the rider gets on the open-cabin vehicle. In the case of an open-cabin vehicle, a rider gets on the open-cabin vehicle after completing travel preparations (clothing, helmet, gloves and the like). Once the rider has completed the travel preparations, the rider may sometimes not want to perform a remote control operation if at all possible. This is because the rider must take off the gloves and the helmet or the like that they have just taken the trouble to put on, and then perform a remote control operation.

Therefore, the present inventors had the idea of mounting a control apparatus that transmits an identification signal as typified by a beacon in an open-cabin vehicle instead of utilizing a remote controller, and utilizing the identification signal to activate electronic devices. In this case, the preparation time period from when the rider approaches the open-cabin vehicle until the rider gets on the open-cabin vehicle can be utilized for activation of the electronic devices. Specifically, a control apparatus (including an identification signal transmission unit that transmits an identification signal) mounted in the open-cabin vehicle intermittently transmits an identification signal. In this case, a portable terminal carried by the rider receives the identification signal at a location away from the open-cabin vehicle without an operation being performed by the rider. Subsequently, when a response signal from the portable terminal is returned to the open-cabin vehicle without an operation being performed by the rider, the control apparatus permits current conduction to the electronic devices. In this case, the aforementioned preparation time period can be used for activation of the electronic devices. Further, the electronic devices start the activation process without the need for the rider to perform any additional operations after completing the travel preparations.

On the other hand, in the case of detecting a portable terminal which is in a region away from the open-cabin vehicle, there is the possibility that the electric power consumption of the control apparatus will increase with the control apparatus including the identification signal transmission unit which intermittently transmits an identification signal. As described above, the battery capacity of an open-cabin vehicle is small. Therefore, it had been considered difficult to employ a control apparatus that includes an identification signal transmission unit in an open-cabin vehicle.

However, the electric power consumption can be suppressed if the frequency of transmitting the identification signal is reduced. If the frequency of transmitting the identification signal is reduced, the accuracy with which the open-cabin vehicle detects the portable terminal will decrease. If the detection accuracy decreases, variations will arise in the timing at which the portable terminal is detected. However, even in this case, in the present teaching, before the rider reaches the open-cabin vehicle, activation of electronic devices can be started in response to the reception of a response signal from a portable terminal that received an identification signal transmitted from the identification signal transmission unit. Therefore, activation of the electronic devices can be started before the rider reaches the open-cabin vehicle (before the open-cabin vehicle enters a travel-enabled state). Therefore, it has been found that, by utilizing a control apparatus in which an identification signal transmission unit is mounted, the convenience provided by electronic devices can be enjoyed while suppressing electric power consumption and also suppressing a reduction in the convenience of the open-cabin vehicle.

An open-cabin vehicle according to the present teaching that was completed based on the above findings adopts the following configurations.

(1) According to one aspect, an open-cabin vehicle according to the present teaching is an open-cabin vehicle whose riding area is not an enclosed space, including:
an electric power source;
a driving force generating apparatus configured to generate a driving force;
a driving force control apparatus configured to control the driving force generating apparatus;
a first electric power supply circuit electrically connectable to an electronic device, the first electric power supply circuit being capable of supplying electric power to the electronic device;
a second electric power supply circuit capable of supplying electric power to the driving force control apparatus; and
an electric power control apparatus configured to control current conduction and current interruption in the first electric power supply circuit, and control current conduction and current interruption in the second electric power supply circuit.

The electric power control apparatus includes:
an identification signal transmission unit configured to intermittently transmit an identification signal including identifiable information, without any operation by a rider, who carries a portable terminal, on the open-cabin vehicle or the portable terminal;
a response signal reception unit configured to receive a response signal transmitted from the portable terminal in response to the identification signal that is intermittently transmitted, without any operation by the rider, who carries the portable terminal, on the open-cabin vehicle or the portable terminal; and
a command unit configured to, when the response signal reception unit receives the response signal, command current conduction in the first electric power supply circuit and not to command current conduction in the second electric power supply circuit.

In this specification, the term "open-cabin vehicle" refers to a vehicle in which a cabin is not an enclosed space and is open to the outside, and in which a door is not provided beside a seat. An open-cabin vehicle is, for example, a straddled vehicle or an ROV (Recreational Off-Highway Vehicle). In some cases an ROV includes a door that does not have a window. A straddled vehicle is, for example, a motorcycle or an all terrain vehicle (ATV). In the present embodiment, a motorcycle is described as an example of an open-cabin vehicle. However, an open-cabin vehicle is not limited to a motorcycle. The term "open-cabin vehicle" includes the vehicles described in the above definition.

Herein, the terms "current conduction" and "current interruption" mean current conduction and current interruption with respect to the supply of electric power. Accordingly, the phrase "current conduction in the first supply circuit" means that the first electric power supply circuit supplies electric power from an electric power source to an electronic device, and the phrase "current interruption in the first supply circuit" means that the first electric power supply circuit stops the supply of electric power from the electric power source to the electronic device. Further, the phrase "current conduction in the second supply circuit" means that the second electric power supply circuit supplies electric power from an electric power source to an electronic device, and the phrase "current interruption in the second supply circuit" means that the second electric power supply circuit stops the supply of electric power from the electric power source to the electronic device.

The term "command" is not limited 100% to a command by the command unit. For example, in a case where the electric power of the electric power source is insufficient, the command unit need not command the current conduction. In other words, if the command unit commands the current conduction even one time, such a case corresponds to "command".

Further, the phrase "without any operation by a rider, who carries a portable terminal, on the open-cabin vehicle or the portable terminal" means without the rider operating an operation button that is a physical key (hardware key) or a software key (key reproduced by means of software) of the portable terminal or operating a physical key or a software key of the open-cabin vehicle. A physical key is a key (hardware key) for which an on or off state is detected when a switch or a button is physically moved. The physical keys or software keys of the portable terminal are, for example, a keyboard or a numeric keypad, an electric power source button, a volume button, or a home button for returning to a home screen. The physical keys of the open-cabin vehicle are, for example, various kinds of operation switches (an ignition switch, a main switch, an accelerator grip, a brake lever, an indicator switch, and a switch for switching between a high beam and a low beam of a headlight). In some cases, software keys can function as the aforementioned operation switches.

The portable terminal is, for example, a smartphone, a PDA (Personal Digital Assistant) typified by a portable telephone, a tablet, a smart key, a notebook computer, or a portable game machine.

In this case, if a rider who is carrying the portable terminal performs an action of approaching the open-cabin vehicle that includes the electric power control apparatus, before the rider reaches the open-cabin vehicle, electric power is supplied to the electronic device and the electronic device starts an activation process. Accordingly, in comparison to a conventional case in which a rider activates an electronic device after arriving at an open-cabin vehicle, the time period from when the rider reaches the open-cabin vehicle until the electronic device enters a normal state (e.g., a usable state) can be shortened. Therefore, the convenience provided by the electronic device can be enjoyed while suppressing a reduction in the convenience of the open-cabin vehicle.

(2) According to another aspect, in the open-cabin vehicle of the present teaching, the portable terminal includes key information.

The electric power control apparatus further includes:

a request signal transmission unit configured to, when the response signal reception unit receives a response signal, transmit a request signal that requests the portable terminal to transmit a key information signal that includes key information, without any operation by the rider, who carries the portable terminal, on the open-cabin vehicle or the portable terminal;

a key information signal reception unit configured to receive the key information signal that includes the key information transmitted from the portable terminal in response to the request signal from the request signal transmission unit, without any operation by the rider, who carries the portable terminal, on the open-cabin vehicle or the portable terminal;

and a current conduction permission determining unit configured to determine whether or not to permit current conduction based on the key information signal that is received by the key information signal reception unit.

When the current conduction permission determining unit permits current conduction, the command unit commands current conduction in the first electric power supply circuit and does not command current conduction in the second electric power supply circuit.

In this case, key authentication is performed when a distance between the rider who is carrying the portable terminal and the open-cabin vehicle becomes equal to or less than a predetermined distance. Therefore, security can be enhanced.

(3) According to another aspect, in the open-cabin vehicle of the present teaching, the response signal includes distance information relating to a distance between the portable terminal and the open-cabin vehicle.

The electric power control apparatus further includes:

a distance determining unit configured to, based on the response signal including the distance information that is transmitted from the portable terminal without any operation by the rider, who carries the portable terminal, on the open-cabin vehicle or the portable terminal, determine whether a distance between the portable terminal and the open-cabin vehicle is not more than a first distance or is not more than a second distance that is shorter than the first distance.

The command unit:

commands current conduction in the first electric power supply circuit and does not command current conduction in the second electric power supply circuit when the distance determining unit determines that a distance between the portable terminal and the open-cabin vehicle is not more than the first distance; and commands current conduction in the second electric power supply circuit when the distance determining unit determines that a distance between the portable terminal and the open-cabin vehicle is not more than the second distance that is shorter than the first distance.

In this case, if the rider performs an action of approaching the open-cabin vehicle, the electronic device starts an activation process in advance when the rider is at a distance that is not more than the first distance, and activation of a driving force control apparatus is started when the rider is at a distance that is not more than the second distance that is closer to the open-cabin vehicle than the first distance. By this means, not only can the time period from when the rider reaches the open-cabin vehicle until the electronic device enters a normal state be shortened, but the time period until the open-cabin vehicle enters a travel-enabled state can also be shortened. In addition, by starting activation of the driving force control apparatus when the rider is at a distance that is not more than the second distance that is closer to the open-cabin vehicle than the first distance, the occurrence of a situation in which a third party other than the rider gets on the open-cabin vehicle and unlocks a handle lock and/or starts up the driving force generating apparatus or the like before the rider reaches the open-cabin vehicle can be inhibited.

(4) According to another aspect, in the open-cabin vehicle of the present teaching, the response signal includes distance information relating to a distance between the portable terminal and the open-cabin vehicle.

The electric power control apparatus further includes:

a distance determining unit configured to, based on the response signal including the distance information that is transmitted from the portable terminal without any operation by the rider, who carries the portable terminal, on the open-cabin vehicle or the portable terminal, determine whether a distance between the portable terminal and the open-cabin vehicle is not more than a first distance or is not more than a second distance that is shorter than the first distance.

The command unit:

commands current conduction in the first electric power supply circuit and does not command current conduction in the second electric power supply circuit when the current conduction permission determining unit permits current conduction and the distance determining unit determines that a distance between the portable terminal and the open-cabin vehicle is not more than the first distance; and commands current conduction in the second electric power supply circuit when the current conduction permission determining unit permits current conduction and the distance determining unit determines that a distance between the portable terminal and the open-cabin vehicle is not more than the second distance that is shorter than the first distance.

In this case, if the rider performs an action of approaching the open-cabin vehicle, the electronic device starts an activation process in advance when the rider is at a distance that is not more than the first distance, and activation of the driving force control apparatus is started when the rider is at a distance that is not more than the second distance that is closer to the open-cabin vehicle than the first distance. By this means, not only can the time period from when the rider reaches the open-cabin vehicle until the electronic device enters a normal state be shortened, but the time period until the open-cabin vehicle enters a travel-enabled state can also be shortened. In addition, by starting activation of the driving force control apparatus when the rider is at a distance that is not more than the second distance that is closer to the open-cabin vehicle than the first distance, the occurrence of a situation in which a third party other than the rider gets on the open-cabin vehicle and unlocks a handle lock and/or starts up the driving force generating apparatus or the like before the rider reaches the open-cabin vehicle can be inhibited. Furthermore, the security can be enhanced.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which this teaching belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the teaching, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the teaching and the claims.

In the following description, for the purpose of explanation, numerous specific details are set forth in order to provide a thorough understanding of the present teaching. It will be evident, however, to one skilled in the art that the present teaching may be practiced without these specific details. The present disclosure is to be considered as an exemplification of the teaching and is not intended to limit the teaching to the specific embodiments illustrated by the figures or description below.

DETAILED DESCRIPTION

Embodiments of the present teaching are described hereinafter. In the following description, for the purpose of explanation, numerous specific details are set forth in order to provide an understanding of the present teaching. It will be evident, however, to one skilled in the art that the present teaching may be practiced without these specific details. The present disclosure is to be considered as an exemplification of the present teaching, and is not intended to limit the teaching to the specific embodiments illustrated by the figures or description below.

First Embodiment

[Overall Configuration of Open-Cabin Vehicle]

In this specification, the term "open-cabin vehicle" refers to a vehicle in which a door that has a window is not provided beside a seat. An open-cabin vehicle is, for example, a straddled vehicle or an ROV (Recreational Off-Highway Vehicle). In some cases an ROV includes a door that does not have a window. A straddled vehicle is, for example, a motorcycle or an all terrain vehicle (ATV). In the present embodiment, a motorcycle is described as an example of an open-cabin vehicle. However, an open-cabin vehicle is not limited to a motorcycle. The term "open-cabin vehicle" includes the vehicles described in the above definition.

Figure 1:
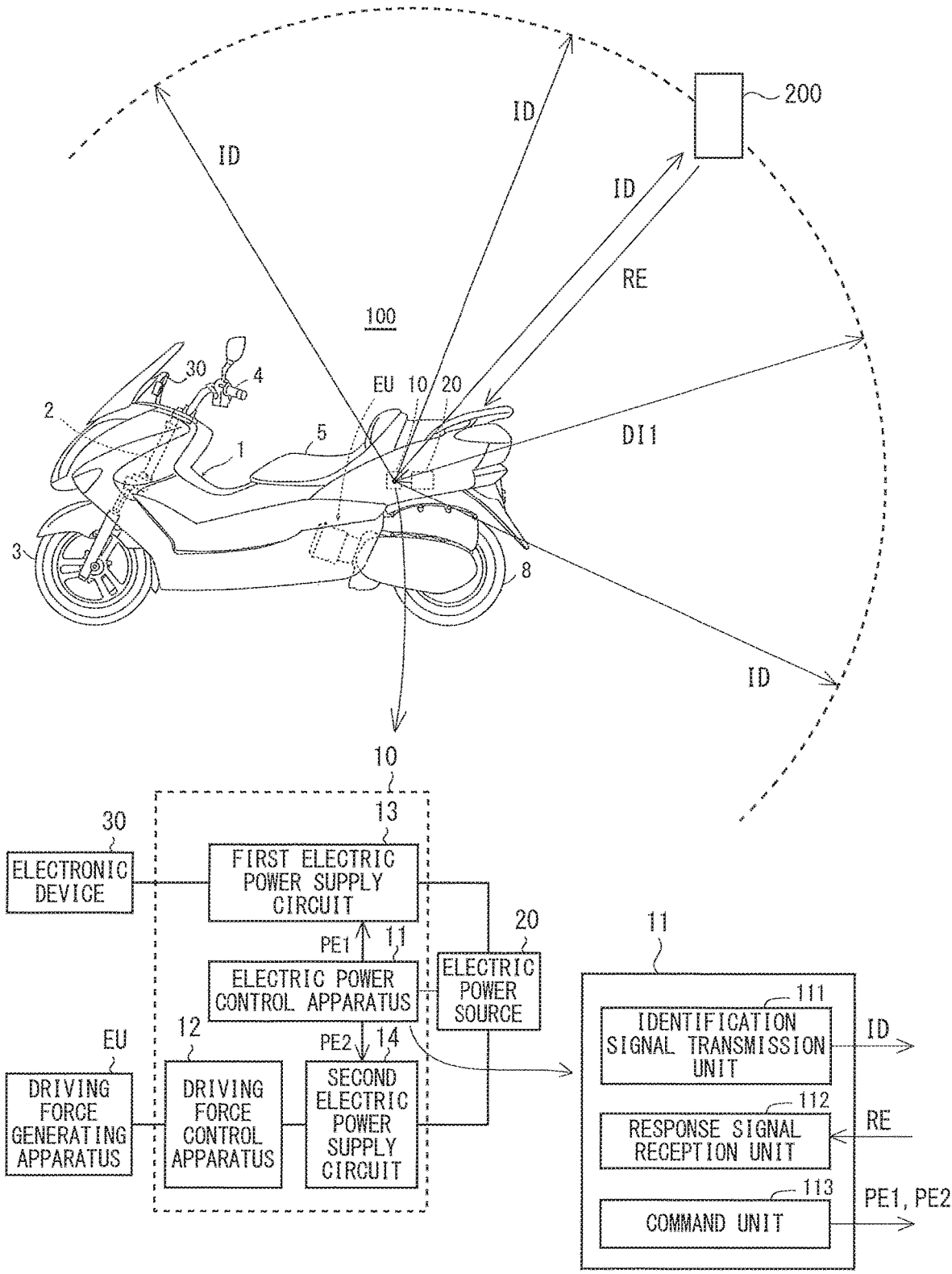
FIG. 1 is a schematic diagram illustrating the overall configuration of an open-cabin vehicle according to a first embodiment.

FIG. 1 is a schematic diagram illustrating the configuration of an open-cabin vehicle (motorcycle) according to one embodiment of the present teaching. Although in the following description a motorcycle is described as an open-cabin vehicle, as mentioned above, an open-cabin vehicle is not limited to a motorcycle. Referring to FIG. 1, in a motorcycle 100, a front fork 2 is provided at a front part of the motorcycle 100. A handle 4 is attached to a top end of the front fork 2. A front wheel 3 is rotatably attached to a bottom end of the front fork 2.

A seat 5 is disposed at an upper part at approximately the center of the vehicle 1. A control apparatus 10 and an electric power source 20 are disposed below a rear part of the seat 5. The control apparatus 10 controls a driving force generating apparatus EU, and also controls other components than the driving force generating apparatus EU inside the motorcycle 100. The electric power source 20 is, for example, a battery. The driving force generating apparatus EU is provided at a lower part of the vehicle 1. The driving force generating apparatus EU may be an engine or may be a motor. A rear wheel 8 is rotatably attached to a lower part at the rear end of the vehicle 1. The rear wheel 8 is rotated by a motive force that is generated by the driving force generating apparatus EU.

[Functional Block Diagram of Area Around Control Apparatus 10]

A functional block diagram of the control apparatus 10 and the area around the control apparatus 10 is shown in FIG. 1. Referring to FIG. 1, the electric power source 20 supplies electric power to the control apparatus 10. The control apparatus 10 is connected to the driving force generating apparatus EU, and controls the driving force generating apparatus EU.

The control apparatus 10 is also electrically connectable to an electronic device 30. The electronic device 30 is, for example, a PDA (Personal Digital Assistant), a navigation system device, a telephone system device, a communication system device for electronic mail or the like, or an audio player device. The electronic device 30 may be a device that is installed in advance in the motorcycle 100. The electronic device 30 may also be a device that is not installed in advance in the motorcycle 100, and is detachably attachable to the motorcycle 100. The electronic device 30 that is detachably attachable has a connector (for example, a USB) for feeding electric power thereto.

[Functional Block Diagram of Control Apparatus 10]

Referring to FIG. 1, a driving force control apparatus 12 inside the control apparatus 10 controls the driving force generating apparatus EU. The driving force control apparatus is, for example, an ECU (Engine Control Unit). A second electric power supply circuit 14 is electrically connected to the electric power source 20. The second electric power supply circuit 14 is also electrically connected to the driving force control apparatus 12. Here, the term "electrically connected" means a state in which current conduction is enabled and in which it is possible to receive the supply of electric power. The second electric power supply circuit 14 receives electric power from the electric power source 20, and supplies electric power to the driving force control apparatus 12 or interrupts the electric power supply to the driving force control apparatus 12. That is, the second electric power supply circuit 14 functions as a switching circuit (e.g., a driver).

A first electric power supply circuit 13 is electrically connected to the electric power source 20. The first electric power supply circuit 13 is also electrically connected to the electronic device 30. The electronic device 30 may be a device that is detachably attached to the motorcycle 100, or may be a device that is integrated with and fixed to the motorcycle 100. In a case where the electronic device 30 is detachable from the motorcycle 100, when the electronic device 30 is attached to the motorcycle 100, the first electric power supply circuit 13 is electrically connected to the electronic device 30. The first electric power supply circuit 13 receives electric power from the electric power source 20, and supplies electric power to the electronic device 30 that is electrically connected to the first electric power supply circuit 13 or interrupts the supply of electric power to the electronic device 30. That is, the first electric power supply circuit 13 functions as a switching circuit (e.g., a driver).

An electric power control apparatus 11 is electrically connected to the electric power source 20, the first electric power supply circuit 13 and the second electric power supply circuit 14. The electric power control apparatus 11 controls current conduction and current interruption in the first electric power supply circuit 13. That is, the electric power control apparatus 11 causes the first electric power supply circuit 13 to supply electric power from the electric power source 20 to the electronic device 30 or to interrupt the supply of electric power to the electronic device 30. The electric power control apparatus 11 also controls current conduction and current interruption in the second electric power supply circuit 14. That is, the electric power control apparatus 11 causes the second electric power supply circuit 14 to supply electric power from the electric power source 20 to the driving force control apparatus 12 or to interrupt the supply of electric power to the driving force control apparatus 12.

A functional block diagram of the electric power control apparatus 11 is shown in FIG. 1. Referring to FIG. 1, the electric power control apparatus 11 includes an identification signal transmission unit 111. The identification signal transmission unit 111 intermittently transmits an identification signal ID (for example, a beacon) including identifiable information to outside. Here, the identifiable information is, for example, a UUID (Universally Unique Identifier), a UIID (Unique Installation Identifier), or a Secure UDID (Unique Device Identifier).

The identification signal transmission unit 111 autonomously transmits the identification signal ID to outside the open-cabin vehicle intermittently. Accordingly, the identification signal transmission unit 111 intermittently transmits the identification signal ID to outside the open-cabin vehicle without any operation by a rider, who carries a portable terminal 200, on the motorcycle 100 or the portable terminal 200. Here, the phrase "without any operation by a rider, who carries the portable terminal 200, on the motorcycle 100 or the portable terminal 200" means that a rider does not operate an operation button that is a physical key (hardware key) or a software key (key reproduced by means of software within a display) of the portable terminal or operate a physical key or a software key of the motorcycle 100. Further, the term "intermittently" means that the identification signal transmission unit 111 may transmit at prescribed time intervals or may transmit discontinuously or irregularly. Preferably, the identification signal transmission unit 111 transmits the identification signal ID periodically at prescribed time intervals. The term "prescribed time interval" refers to, for example, an interval of 10 to 5000 msec. A preferable lower limit of the prescribed time interval is 50 msec, and further preferably is 100 msec. A preferable upper limit of the prescribed time interval is 2000 msec, more preferably is 1000 msec, further preferably is 800 msec, and further preferably is 700 msec. However, the prescribed time interval is not limited to the aforementioned intervals, and can be freely set.

The electric power control apparatus 11 further includes a response signal reception unit 112. The response signal reception unit 112 receives a response signal RE that is transmitted from the portable terminal 200 that responded to the identification signal ID, without any operation by the rider, who carries the portable terminal 200, on the motorcycle 100 or the portable terminal 200. At this time, the response signal reception unit 112 receives the response signal RE transmitted from the portable terminal 200, without any operation by the rider, who carries the portable terminal 200, on the motorcycle 100 or the portable terminal 200. The phrase "without any operation by the rider, who carries the portable terminal 200, on the motorcycle 100 or the portable terminal 200" means that the rider does not operate an operation button that is a physical key (hardware key) or a software key (key reproduced by means of software within a display) of the portable terminal or operate a physical key or a software key of the motorcycle 100.

The electric power control apparatus 11 further includes a command unit 113. When the response signal reception unit 112 receives the response signal RE transmitted from the portable terminal 200, the command unit 113 commands current conduction in the first electric power supply circuit 13 without any operation by the rider, who carries the portable terminal 200, on the motorcycle 100 or the portable terminal 200. For example, when the response signal reception unit 112 receives the response signal RE, without any operation by the rider, who carries the portable terminal 200, on the motorcycle 100 or the portable terminal 200, the command unit 113 outputs, to the first electric power supply circuit 13, a current conduction permission signal PE1 which permits the supply of electric power from the electric power source 20 to the electronic device 30. Upon receiving the current conduction permission signal PE1, the first electric power supply circuit 13 supplies electric power from the electric power source 20 to the electronic device 30, without any operation by the rider, who carries the portable terminal 200, on the motorcycle 100 or the portable terminal 200. When the electronic device 30 receives the supply of electric power (upon receiving the electric power), the electronic device 30 starts an activation process without any operation by the rider, who carries the portable terminal 200, on the motorcycle 100 or the portable terminal 200. The phrase "without any operation by the rider, who carries the portable terminal 200, on the motorcycle 100 or the portable terminal 200" means that the rider does not operate an operation button that is a physical key (hardware key) or a software key (key reproduced by means of software within a display) of the portable terminal or operate a physical key or a software key of the motorcycle 100.

[Hardware Configuration of Electric Power Control Apparatus 11 and Portable Terminal 200]

Figure 2:
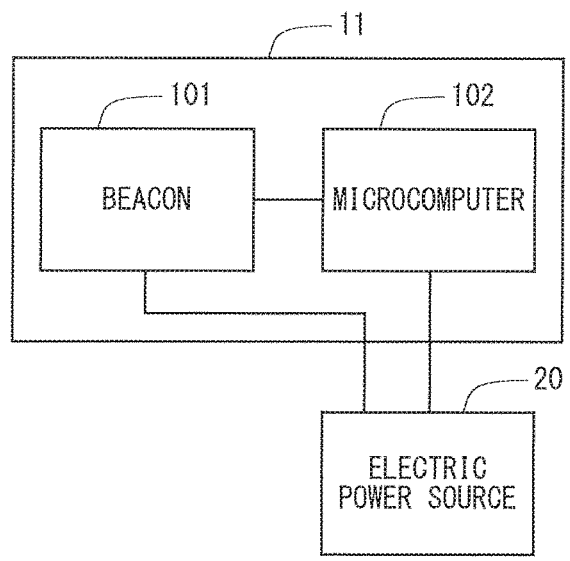
FIG. 2 is a functional block diagram of an electric power control apparatus shown in FIG. 1.

FIG. 2 is a functional block diagram that illustrates an example of the hardware configuration of the electric power control apparatus 11 shown in FIG. 1. Referring to FIG. 2, the electric power control apparatus 11 includes a beacon 101 and a microcomputer 102. The beacon 101 and the microcomputer 102 may be mounted on a single chip. The beacon 101 may be mounted on a separate chip from the microcomputer 102. The beacon 101 corresponds to the identification signal transmission unit 111 in the functional block diagram of the electric power control apparatus 11 shown in FIG. 1.

Figure 3:
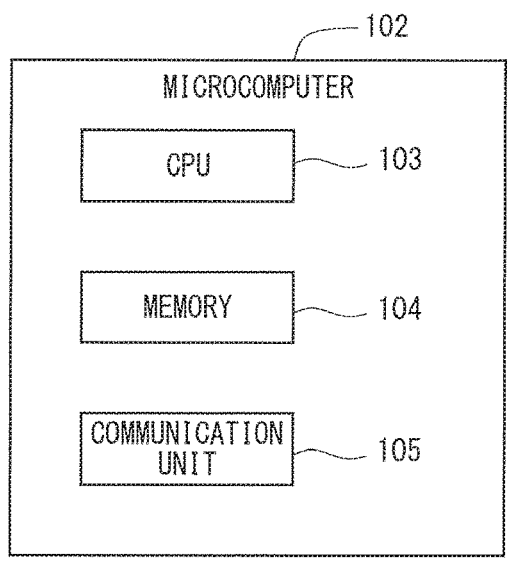
FIG. 3 is a functional block diagram of a microcomputer shown in FIG. 1.

FIG. 3 is a functional block diagram of the microcomputer 102 shown in FIG. 1. The microcomputer 102 includes a central processing unit (CPU) 103, a memory 104 and a communication unit 105. The CPU 103, the memory 104 and the communication unit 105 are connected to each other by an unshown bus. The memory 104 includes unshown RAM and ROM. The functional modules (the response signal reception unit 112 and the command unit 113) shown in FIG. 1 are implemented by an in-advance electric power supply program which is stored in the ROM inside the memory 104 being loaded to the RAM and executed by the CPU 103.

Referring once again to FIG. 2, the beacon 101 and the microcomputer 102 are connected to the electric power source 20, and receive a supply of electric power from the electric power source 20. Note that, in FIG. 2, the beacon 101 receives a supply of electric power from the electric power source 20. However, a configuration may also be adopted in which an electric power source that is different from the electric power source 20 is contained in the beacon 101. In such a case, the electric power source contained in the beacon 101 may be, for example, a primary battery such as a button battery, or may be a secondary battery.

Figure 4:
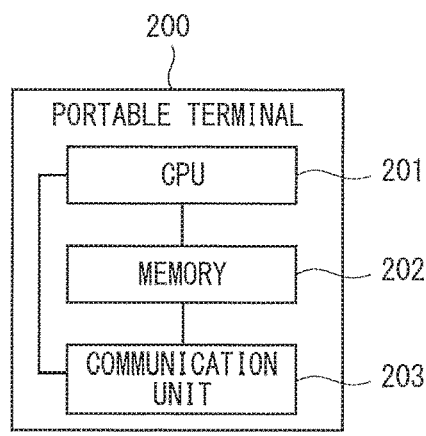
FIG. 4 is a functional block diagram of a portable terminal shown in FIG. 1.

FIG. 4 is a functional block diagram of the portable terminal 200 shown in FIG. 1. Referring to FIG. 4, the portable terminal 200 includes a CPU 201, a memory 202 and a communication unit 203. The CPU 201, the memory 202 and the communication unit 203 are connected to each other by an unshown bus. The memory 202 includes unshown RAM and ROM. The portable terminal 200 executes portable terminal response processing, described later, by a series of operations in which a portable terminal response processing program stored in the memory 202 is loaded and is executed by the CPU 201.

In this case, the portable terminal 200 is a device which a rider can carry and which is capable of communicating with the motorcycle 100. The portable terminal 200 is, for example, a smartphone, a PDA (Personal Digital Assistant) that is typified by a portable telephone, a smart key, a notebook computer, or a portable game machine.

[Outline of Operations of Open-Cabin Vehicle 100]

Referring to FIG. 1, the electric power control apparatus 11 intermittently transmits the identification signal ID within the range of a distance Dl1 centering on the electric power control apparatus 11. At this time, when the motorcycle 100 is seen from above (in a planar view), the electric power control apparatus 11 transmits the identification signal ID in all directions.

In the portable terminal 200 which the rider of the motorcycle 100 is carrying, the portable terminal response processing program that is stored in advance in the memory 202 as described above is operating. On the other hand, in the electric power control apparatus 11 of the motorcycle 100, the in-advance electric power supply program that is stored in the memory 104 is operating.

When the rider who is carrying the portable terminal 200 approaches the motorcycle 100, prior to the rider reaching the motorcycle 100, the portable terminal 200 receives the identification signal ID within the range which the identification signal ID can reach (range of the distance Dl1 from the electric power control apparatus 11). At this time, the portable terminal 200 transmits the response signal RE that corresponds to the identification signal ID to the motorcycle 100 without any operation by the rider, who carries the portable terminal 200, on the motorcycle 100 or the portable terminal 200. Here, the phrase "without any operation by the rider, who carries the portable terminal, on the motorcycle or the portable terminal" means that the rider does not operate an operation button that is a physical key (hardware key) or software key (key reproduced by means of software) of the portable terminal or operate a physical key or a software key of the open-cabin vehicle.

The electric power control apparatus 11 receives the response signal RE that is transmitted from the portable terminal 200. At this time, the electric power control apparatus 11 commands current conduction in the first electric power supply circuit 13 at the first electric power supply circuit 13. As a result, the first electric power supply circuit 13 supplies electric power of the electric power source 20 to the electronic device 30 that is connected to the first electric power supply circuit 13. Upon receiving the electric power from the electric power source 20, the electronic device 30 starts an activation process.

Note that, upon receiving the response signal RE, the electric power control apparatus 11 commands current conduction in the first electric power supply circuit 13, but does not command current conduction in the second electric power supply circuit 14. That is, when the response signal RE is received, although the first electric power supply circuit 13 supplies electric power to the electronic device 30, at that time point the second electric power supply circuit 14 does not supply electric power to the driving force control apparatus 12. Therefore, at the time point at which the electronic device 30 starts an activation process, the driving force control apparatus 12 does not start an activation process and the driving force generating apparatus EU also does not start an activation process.

As described above, in the present teaching, upon the rider who is carrying the portable terminal 200 entering the range of the distance DI1 from the electric power control apparatus 11, the electric power control apparatus 11 commands current conduction in the first electric power supply circuit at the first electric power supply circuit 13, and the electronic device 30 starts an activation process. Therefore, the time period from when the rider reaches the motorcycle 100 until the electronic device 30 enters a normal state is shortened in comparison to a case where the rider presses the main switch of the motorcycle 100 after reaching the motorcycle 100 and thereby activates the electronic device 30. This is because, before the rider reaches the motorcycle 100, electric power is supplied in advance to the electronic device 30 and activation is started. Consequently, after the rider has reached the motorcycle, the time period until the electronic device 30 enters a normal state after the rider presses the main switch and activates the driving force control apparatus 12 to enter a travel-enabled state can be reduced. As a result, the stress of the rider can be reduced, and the convenience of the motorcycle 100 and the electronic device 30 can be enhanced.

Here, the phrase "the electronic device 30 enters a normal state (usable state)" means that the electronic device 30 enters a state in which the electronic device 30 can perform normal operations. For example, in a case where the electronic device 30 is a navigation system, it means that a state is entered in which the input of a destination or guidance to a destination are possible. In a case where the electronic device 30 is an audio player, it means that a state is entered in which music data can be reproduced. In a case where the electronic device 30 is a telephone system device, for example, it means that a state is entered in which it is possible to access contact address information in the telephone system device and in which calls can be made. In a case where the electronic device 30 is a communication system device for electronic mail or the like, it means that a state is entered in which it is possible to create electronic mail and in which electronic mail can be sent and received.

Further, the phrase "the motorcycle 100 enters a travel-enabled state" means that the state is one in which it is possible for the driving force control apparatus 12 to control the driving force generating apparatus EU to generate a driving force (in other words, a state in which it is possible for the motorcycle 100 to start to move).

Note that, in the present example, when the rider reaches the motorcycle 100 and the rider presses the main switch (not illustrated in the drawings) that is provided in the motorcycle 100, an activation signal is output from the main switch. When the electric power control apparatus 11 receives a current conduction permission signal PE2 from the main switch, the electric power control apparatus 11 commands current conduction in the second electric power supply circuit 14. By this means, the driving force control apparatus 12 starts an activation process and a travel-enabled state is entered.

In many cases, a time period from when the driving force control apparatus 12 starts an activation process until entering a travel-enabled state is shorter than a time period from when the electronic device 30 is activated until the electronic device 30 enters a normal state. In the present embodiment, activation of the electronic device 30 can be started before the rider reaches the motorcycle 100 and presses the main switch of the motorcycle 100, or can be started quickly around the time the rider presses the main switch. Therefore, the time period from when the rider reaches the motorcycle 100 until the electronic device 30 enters a normal state can be shortened in comparison to a case where the rider presses the main switch upon reaching the motorcycle 100 to thereby activate the electronic device 30.

In addition, according to the present embodiment, the rider does not operate the portable terminal 200 or operate the motorcycle 100 to start activation of the electronic device 30, and instead the rider can start activation of the electronic device 30 by performing the action of approaching the motorcycle 100 and without an operation by the rider on the motorcycle 100 or the portable terminal 200. Therefore, the rider who has put on a helmet and gloves and completed travel preparations can activate the electronic device 30 without performing additional actions such as taking off the helmet or gloves and operating the portable terminal 200. Therefore, the convenience is further enhanced.

Hereinafter, operations of the electric power control apparatus 11 and the portable terminal 200 in the present embodiment are described in detail using flowcharts.

[Operations of Electric Power Control Apparatus 11 and Portable Terminal 200]

To realize the aforementioned operations, beacon transmission processing that intermittently transmits an identification signal ID, operation processing of the portable terminal 200 that responds to the identification signal ID (portable terminal response processing), and operation processing of the motorcycle 100 that responds to the operation processing of the portable terminal (in-advance electric power supply processing) are performed. The beacon transmission processing and the in-advance electric power supply processing are performed by the electric power control apparatus 11 within the motorcycle 100. The portable terminal response processing is performed by the portable terminal 200.

[Beacon Transmission Processing]

Figure 5:
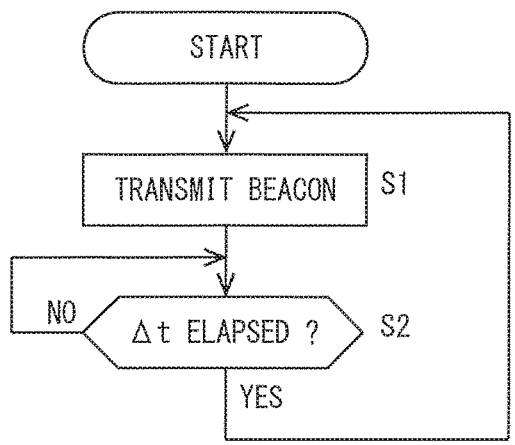
FIG. 5 is an operation flowchart of beacon transmission processing by the electric power control apparatus shown in FIG. 1.

FIG. 5 is an operation flowchart of the beacon transmission processing. Referring to FIG. 5, the identification signal transmission unit 111 in the electric power control apparatus 11 transmits the identification signal ID (beacon) in all directions (S1) with respect to the motorcycle 100 each time a predetermined time period Δt elapses (Yes in S2). Note that, as described above, the identification signal transmission unit 111 autonomously transmits the identification signal ID. That is, the identification signal transmission unit 111 transmits the identification signal ID without any operation by the rider on the motorcycle 100 or the portable terminal 200. Here, as described above, the phrase "without any operation by the rider on the motorcycle 100 or the portable terminal 200" means that the rider does not operate the motorcycle 100 using a physical key or a software key or the like and does not operate the portable terminal 200 using a physical key or a software key or the like in order to cause the identification signal transmission unit 111 to intermittently transmit the identification signal ID. Specifically, the aforementioned phrase means that as long as electric power is supplied to the identification signal transmission unit 111 from the electric power source 20 or from an electric power source such as a battery that the identification signal transmission unit 111 includes, it is not necessary for the rider to operate the motorcycle 100 or to operate the portable terminal 200 in order for the identification signal transmission unit 111 to transmit the identification signal ID.

[Portable Terminal Response Processing]

Figure 6:
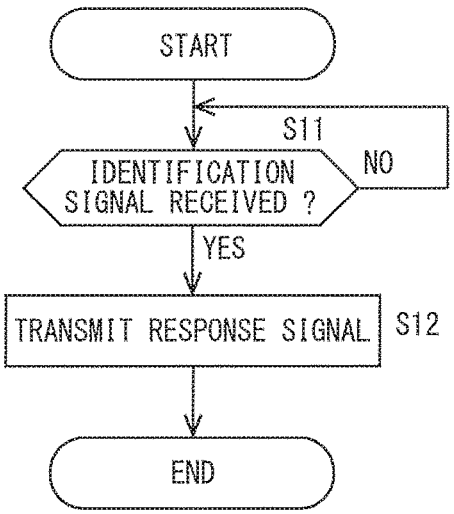
FIG. 6 is an operation flowchart of portable terminal response processing by the portable terminal shown in FIG. 1.

FIG. 6 is an operation flowchart of portable terminal response processing performed by the portable terminal 200. Referring to FIG. 6, when the portable terminal 200 receives the identification signal ID (S11 in FIG. 6) that is transmitted intermittently by the operations in FIG. 5 as described above, the portable terminal 200 transmits the response signal RE to the motorcycle 100 (S12). As described above, in the portable terminal 200, the portable terminal response processing program that is stored in advance in the memory 202 is operating. Furthermore, in the portable terminal 200, information relating to the identification signal ID (identification signal ID information) that is unique to the identification signal transmission unit 111 in the control apparatus 10 of the motorcycle 100 is stored in the memory 202. When the received identification signal ID corresponds to the identification signal ID information stored in the memory 202, the portable terminal 200 transmits the response signal RE.

Note that, when the portable terminal 200 receives the identification signal ID, the portable terminal 200 executes the aforementioned operations and transmits the response signal RE without any operation by the rider on the motorcycle 100 or the portable terminal 200. Here, in S11 and S12, the phrase "without any operation by the rider on the motorcycle 100 or the portable terminal 200" means that when the portable terminal 200 receives the identification signal ID, the portable terminal 200 transmits the response signal RE even without the rider operating the portable terminal 200 using a physical key or a software key or the like. Accordingly, when the portable terminal 200 receives the identification signal ID, the portable terminal 200 transmits the response signal RE without the rider operating an operation button such as a physical key or a software key of the portable terminal 200 or operating the portable terminal 200 by means of a voice control system (system in which operations are performed when the portable terminal 200 authenticates the voice of the rider) or the like of the portable terminal 200.

[In-Advance Electric Power Supply Processing]

Figure 7:
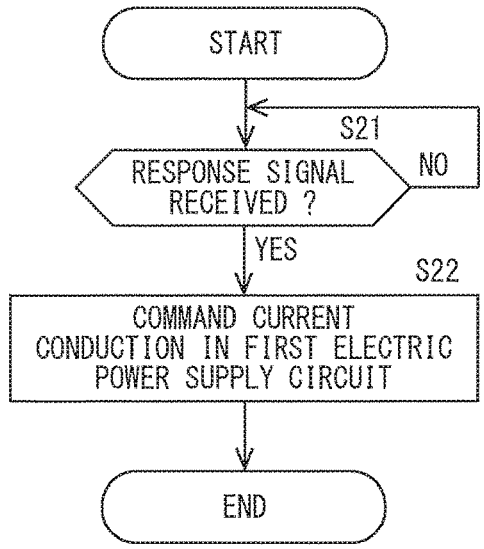
FIG. 7 is an operation flowchart of in-advance electric power supply processing by the electric power control apparatus shown in FIG. 1.

FIG. 7 is an operation flowchart of in-advance electric power supply processing by the electric power control apparatus 11. Referring to FIG. 7, when the response signal RE is transmitted from the portable terminal 200, the response signal reception unit 112 inside the electric power control apparatus 11 receives the response signal RE (Yes in S21). At this time, the response signal reception unit 112 receives the aforementioned response signal RE without any operation by the rider on the motorcycle 100 or the portable terminal 200. In other words, the response signal reception unit 112 automatically receives the response signal RE without the rider operating the electric power control apparatus 11 of the motorcycle 100 or operating the portable terminal 200.

After the response signal reception unit 112 receives the response signal RE, the command unit 113 commands current conduction in the first electric power supply circuit 13 (S22), without any operation by the rider on the motorcycle 100 or the portable terminal 200. Specifically, the command unit 113 outputs the current conduction permission signal PE1 to the first electric power supply circuit 13. At this time, the command unit 113 outputs the current conduction permission signal PE1 without the rider operating the electric power control apparatus 11 of the motorcycle 100 or operating the portable terminal 200.

The first electric power supply circuit 13 that receives the current conduction permission signal PE1 supplies electric power from the electric power source 20 to the electronic device 30. When the electronic device 30 receives the supply of electric power, the electronic device 30 starts an activation process, without any operation by the rider on the motorcycle 100 or the portable terminal 200. That is, when the electronic device 30 receives the supplied electricity, the electronic device 30 starts an activation process.

Note that, when the response signal reception unit 112 receives the response signal RE (Yes in S21), although the command unit 113 commands current conduction in the first electric power supply circuit 13, the command unit 113 does not command current conduction in the second electric power supply circuit 14 (S22). That is, in response to receiving the response signal RE, the command unit 113 only permits current conduction at the first electric power supply circuit 13. Accordingly, in this case, activation of the electronic device 30 starts, and activation of the driving force control apparatus 12 does not start.

By means of the operation flow described above, the electronic device 30 can start an activation process if the rider who carries the portable terminal 200 performs the action of approaching from the electric power control apparatus 11 to a position that within the distance DI1, without any kind of operation by the rider on the motorcycle 100 or the portable terminal 200. Accordingly, by the time the rider reaches the motorcycle 100, the electronic device 30 has already started an activation process. Therefore, in comparison to a case in which the rider activates the electronic device 30 after reaching the motorcycle 100 as in the conventional technology, the time period from when the rider reaches the motorcycle 100 until the electronic device 30 enters a normal state can be shortened.

Note that, in the present embodiment, the rider presses the main switch after reaching the motorcycle 100. At this time, in response to the main switch being pressed (that is, in response to the operation of the rider), the command unit 113 commands current conduction in the second electric power supply circuit 14. Specifically, the command unit 113 outputs the current conduction permission signal PE2. Upon receiving the current conduction permission signal PE2, the second electric power supply circuit 14 supplies the electric power of the electric power source 20 to the driving force control apparatus 12. When the driving force control apparatus 12 receives the supply of electric power, the driving force control apparatus 12 starts an activation process, without any operation by the rider on the motorcycle 100 or the portable terminal 200. When a predetermined time period elapses after starting the activation process, the driving force control apparatus 12 enters a normal state (that is, a state in which the driving force control apparatus 12 can control the driving force generating apparatus EU), to thereby enter a travel-enabled state.

Second Embodiment

In a second embodiment, in in-advance electric power supply processing of the electric power control apparatus 11 and portable terminal response processing of the portable terminal 200, the security is also increased while increasing the convenience of the rider.

Figure 8:
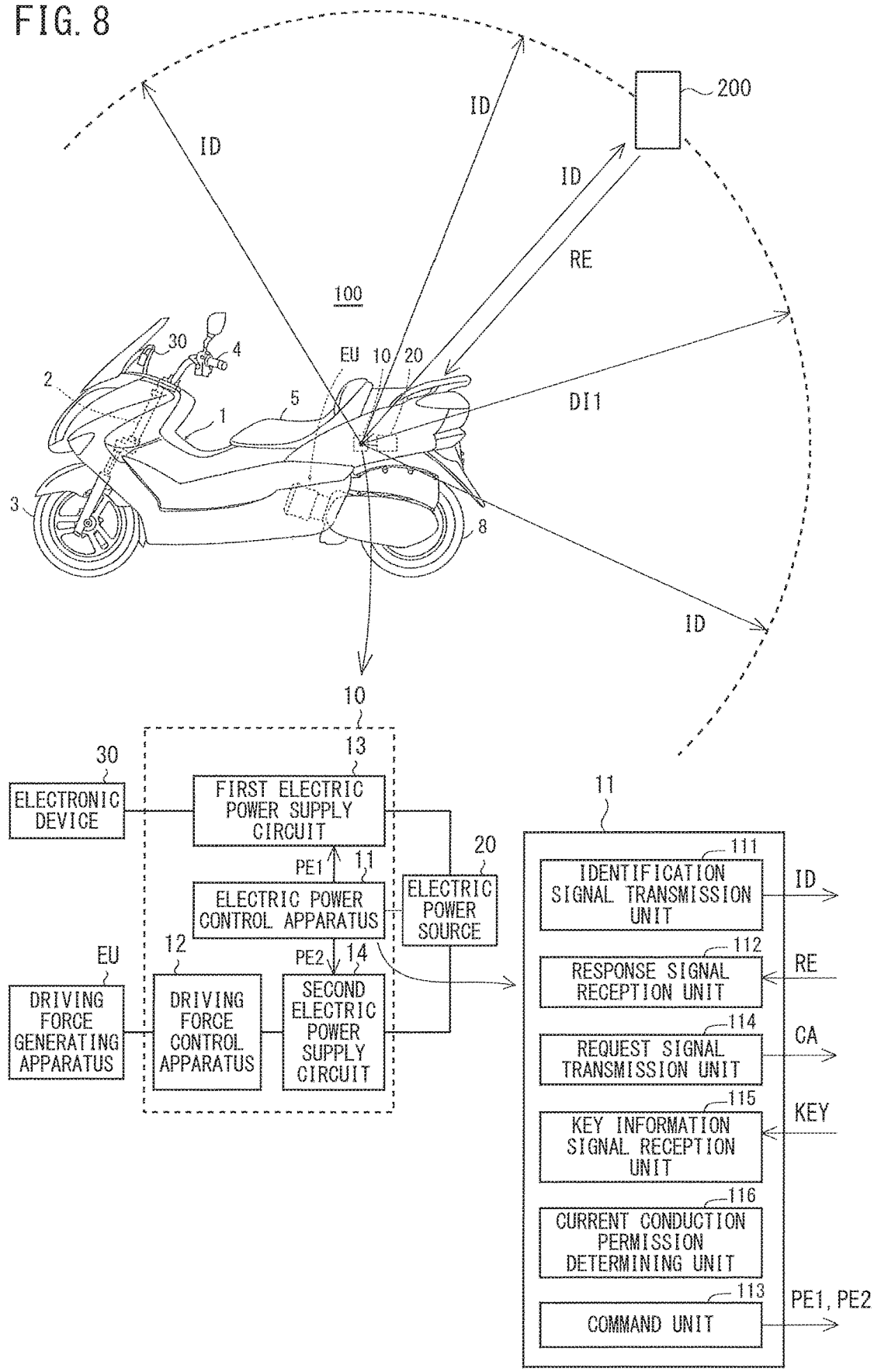
FIG. 8 is a schematic diagram illustrating the overall configuration of an open-cabin vehicle according to a second embodiment.

FIG. 8 is a schematic diagram illustrating the configuration of an open-cabin vehicle (motorcycle) according to the second embodiment. Referring to FIG. 8, in the second embodiment the configuration of the electric power control apparatus 11 is different in comparison to the first embodiment illustrated in FIG. 1.

Referring to FIG. 8, similarly to FIG. 1, the electric power control apparatus 11 includes the identification signal transmission unit 111, the response signal reception unit 112 and the command unit 113.

The electric power control apparatus 11 further includes a request signal transmission unit 114. In response to reception of the response signal RE from the portable terminal 200, the request signal transmission unit 114 transmits to the portable terminal 200 a request signal CA requesting transmission of a signal including key information KEY, without any operation by the rider, who carries the portable terminal 200, on the motorcycle 100 or the portable terminal 200.

The electric power control apparatus 11 also includes a key information signal reception unit 115. The key information signal reception unit 115 receives a key information signal that includes the key information KEY which is transmitted from the portable terminal 200, without any operation by the rider, who carries the portable terminal 200, on the motorcycle 100 or the portable terminal 200. In this case, the key information KEY is a unique ID code. The portable terminal 200 stores the key information KEY that corresponds to the key information (ID code) stored in the electric power control apparatus 11, in advance in the memory 202 or the like. The key information KEY is stored, for example, in a portable terminal response program.

The electric power control apparatus 11 further includes a current conduction permission determining unit 116. Based on the key information KEY received by the key information signal reception unit 115, the current conduction permission determining unit 116 determines whether or not to permit current conduction in the first electric power supply circuit 13, without any operation by the rider, who carries the portable terminal 200, on the motorcycle 100 or the portable terminal 200. Specifically, the current conduction permission determining unit 116 electronically compares the key information KEY received by the key information signal reception unit 115 and the key information that is stored in advance in the electric power control apparatus 11, and determines whether or not the received key information KEY and the key information stored in the electric power control apparatus 11 match. When the received key information KEY and the key information stored in the electric power control apparatus 11 match, the current conduction permission determining unit 116 permits current conduction in the first electric power supply circuit 13.

In the present embodiment, when the current conduction permission determining unit 116 permits current conduction in the first electric power supply circuit 13, the command unit 113 commands current conduction in the first electric power supply circuit 13. For example, the command unit 113 outputs, to the first electric power supply circuit 13, the current conduction permission signal PE1 that permits the supply of electric power from the electric power source 20 to the electronic device 30. At this time, the command unit 113 does not command current conduction in the second electric power supply circuit 14.

Upon receiving the current conduction permission signal PE1, the first electric power supply circuit 13 supplies electric power from the electric power source 20 to the electronic device 30. By this means, the electronic device 30 receives electric power and starts an activation process.

As described above, in comparison to the first embodiment, in the present embodiment so-called "key authentication" is performed in the in-advance electric power supply processing of the electric power control apparatus 11 and the portable terminal response processing of the portable terminal 200. By this means, the security is increased while increasing the convenience of the rider. Hereinafter, beacon transmission processing and in-advance electric power supply processing in the electric power control apparatus 11 as well as portable terminal response processing in the portable terminal 200 that are performed in the present embodiment are described in detail.

[Beacon Transmission Processing]

The beacon transmission processing in the second embodiment is the same as the processing in FIG. 5 of the first embodiment. That is, referring to FIG. 5, each time the predetermined time period Δt elapses (Yes in S2), the identification signal transmission unit 111 in the electric power control apparatus 11 transmits the identification signal ID in all directions with respect to a planar view of the motorcycle 100 (S1). Note that, as described above, the identification signal transmission unit 111 automatically transmits the identification signal ID. That is, the identification signal transmission unit 111 autonomously transmits the identification signal ID, without any operation by the rider on the motorcycle 100 or the portable terminal 200.

[Portable Terminal Response Processing and in-Advance Electric Power Supply Processing]

Figure 9:
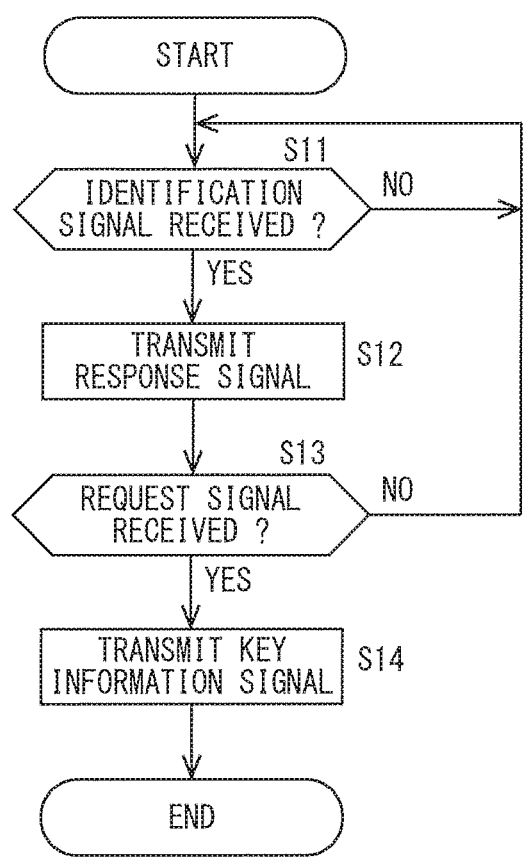
FIG. 9 is an operation flowchart of portable terminal response processing by a portable terminal shown in FIG. 8.
Figure 10:
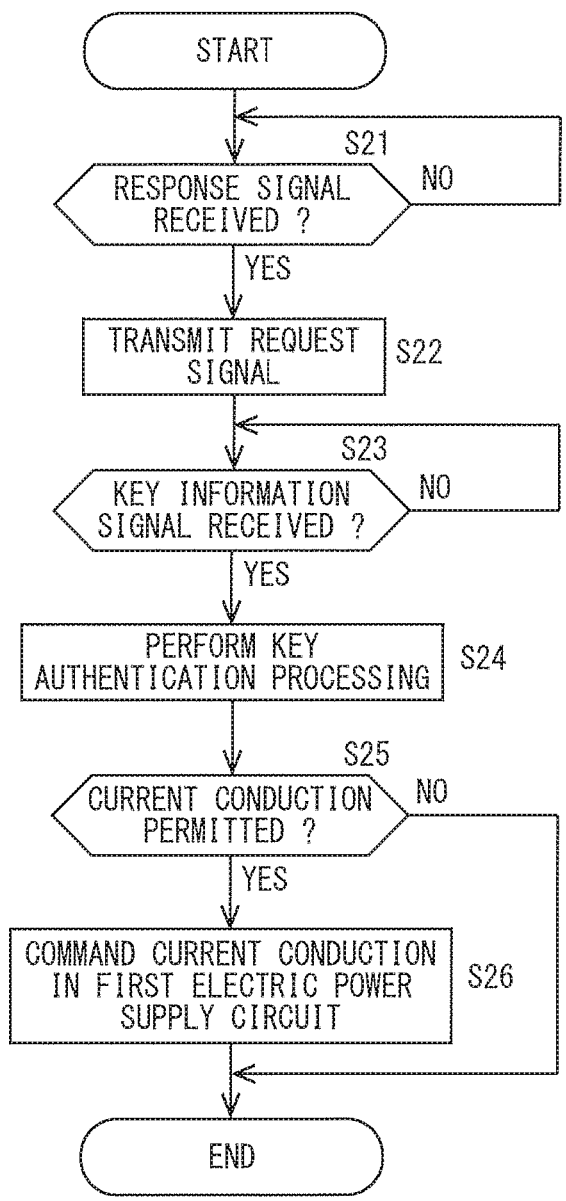
FIG. 10 is an operation flowchart of in-advance electric power supply processing by an electric power control apparatus shown in FIG. 8.

FIG. 9 is an operation flowchart of portable terminal response processing in the portable terminal 200. FIG. 10 is an operation flowchart of in-advance electric power supply processing in the electric power control apparatus 11.

Referring to FIG. 9 and FIG. 10, when the portable terminal 200 receives the identification signal ID that was transmitted from the identification signal transmission unit 111 by the beacon transmission processing (S11), the portable terminal 200 transmits the response signal RE to the motorcycle 100 without an operation being performed by the rider on the motorcycle 100 or the portable terminal 200 (S12). Here, the phrase "without an operation being performed by the rider on the motorcycle 100 or the portable terminal 200" means that, as described above, a rider does not operate an operation button that is a physical key (hardware key) or a software key of the portable terminal 200 and that a rider does not operate a physical key or a software key of the motorcycle 100. The same applies with regard to the respective operations described hereinafter.

The response signal reception unit 112 inside the electric power control apparatus 11 of the motorcycle 100 receives the response signal RE from the portable terminal 200 without an operation being performed by the rider on the motorcycle 100 or the portable terminal 200 (Yes in S21).

In response to reception of the response signal RE by the response signal reception unit 112, the request signal transmission unit 114 transmits, to the portable terminal 200, the request signal CA requesting transmission of a signal including the key information KEY (key information signal), without an operation being performed by the rider on the motorcycle 100 or the portable terminal 200 (S22).

The portable terminal 200 receives the request signal CA without an operation being performed by the rider on the motorcycle 100 or the portable terminal 200 (Yes in S13). In response to the request signal CA that is received, the portable terminal 200 transmits a key information signal including the key information KEY that is stored in advance in the memory 202 to the motorcycle 100, without an operation being performed by the rider on the motorcycle 100 or the portable terminal 200 (S14).

The key information signal reception unit 115 inside the electric power control apparatus 11 of the motorcycle 100 receives the key information signal including the key information KEY (Yes in S23), without an operation being performed by the rider on the motorcycle 100 or the portable terminal 200. At such time, the current conduction permission determining unit 116 inside the electric power control apparatus 11 executes key authentication processing without an operation being performed by the rider on the motorcycle 100 or the portable terminal 200 (S24).

In the key authentication processing, based on the key information KEY that was received in step S23, without any operation by the rider, who carries the portable terminal 200, on the motorcycle 100 or the portable terminal 200, the current conduction permission determining unit 116 determines whether or not to permit current conduction in the first electric power supply circuit 13. The determination method is not particularly limited. For example, the key authentication processing that the current conduction permission determining unit 116 executes may be immobilizer authentication or may be another known authentication method. As one example, as described above, the current conduction permission determining unit 116 of the electric power control apparatus 11 determines whether or not the key information stored in the memory 104 and the key information KEY transmitted from the portable terminal 200 match.

If the current conduction permission determining unit 116 cannot authenticate the key information KEY (No in S25), the in-advance electric power supply processing of the electric power control apparatus 11 ends. In contrast, if the key information KEY could be authenticated, the current conduction permission determining unit 116 permits current conduction in the first electric power supply circuit 13 (Yes in S25). The current conduction permission determining unit 116 executes the above operations without an operation being performed by the rider on the motorcycle 100 or the portable terminal 200.

When the current conduction permission determining unit 116 permits current conduction in the first electric power supply circuit 13 (Yes in S25), the command unit 113 commands current conduction in the first electric power supply circuit 13 (S26). Specifically, the command unit 113 outputs the current conduction permission signal PE1 to the first electric power supply circuit 13 without an operation being performed by the rider on the motorcycle 100 or the portable terminal 200. At this time, the command unit 113 does not command current conduction in the second electric power supply circuit 14.

When the first electric power supply circuit 13 receives the current conduction permission signal PE1, the first electric power supply circuit 13 supplies electric power of the electric power source 20 to the electronic device 30. By this means, the electronic device 30 starts an activation process, and after a specific time period passes, enters a normal state (usable state).

Similarly to the first embodiment, for example, when the rider reaches the motorcycle 100 and pushes the main switch, an activation signal is output from the main switch. Upon receiving the activation signal, the command unit 113 commands current conduction in the second electric power supply circuit 14. Specifically, the command unit 113 outputs the current conduction permission signal PE2 to the second electric power supply circuit 14. The second electric power supply circuit 14 receives the current conduction permission signal PE2, and supplies electric power of the electric power source 20 to the driving force control apparatus 12. By this means, the driving force control apparatus 12 starts an activation process, and after a specific time period passes, a travel-enabled state is entered.

As described above, in the second embodiment also, similarly to the first embodiment, if the rider who carries the portable terminal 200 performs an action of approaching the motorcycle 100 to within a distance corresponding to the first distance DI1 from the electric power control apparatus 11, activation of the electronic device 30 can be started before the rider reaches the motorcycle 100, without the rider operating a physical key or a software key or the like of the motorcycle 100 or operating a physical key or a software key or the like of the portable terminal 200. Therefore, the time period from when the rider reaches the motorcycle 100 until the electronic device 30 enters a normal state can be shortened in comparison to a case where, as with the conventional technology, the rider activates the electronic device 30 after reaching the motorcycle 100. In addition, because key authentication is performed in the in-advance electric power supply processing, the security can be increased.

Third Embodiment

In the above described embodiments, activation of the electronic device 30 is started before the rider reaches the motorcycle 100, based on an action of the rider to approach the motorcycle 100. In the third embodiment, based on an action of the rider to approach the motorcycle 100, activation of the driving force control apparatus 12 of the motorcycle 100 is also started before the rider reaches the motorcycle 100. By this means, when the rider reaches the motorcycle 100, not only is the electronic device 30 already in the process of activating, but the driving force control apparatus 12 also has already started an activation process. Therefore, not only can the time period from when the rider reaches the motorcycle 100 until the electronic device 30 enters a usable state be shortened, but the time period until the motorcycle 100 enters the travel-enabled state can also be shortened.

Figure 11:
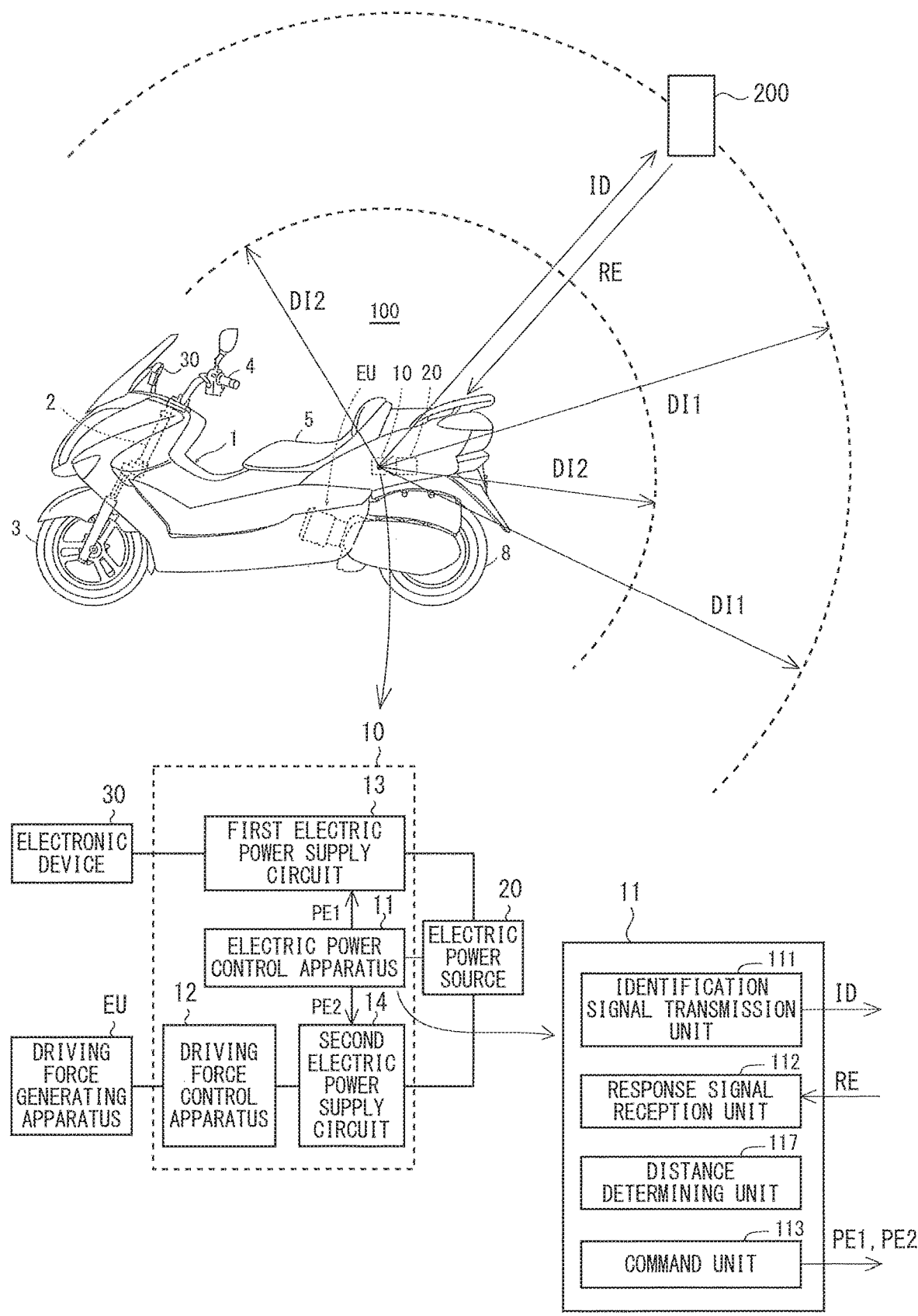
FIG. 11 is a schematic diagram showing the overall configuration of an open-cabin vehicle according to a third embodiment.

FIG. 11 is a schematic diagram illustrating the configuration of an open-cabin vehicle (motorcycle) according to the third embodiment. Referring to FIG. 11, in the third embodiment the configuration of the electric power control apparatus 11 is different in comparison to the first and second embodiments.

Referring to FIG. 11, the identification signal transmission unit 111 intermittently transmits an identification signal ID. The identification signal includes distance information relating to the distance from (the identification signal transmission unit 111 of) the electric power control apparatus 11. For example, the identification signal ID includes an RSSI (received signal strength indicator) that is an index of the signal strength. In FIG. 11, the RSSI at a first distance DI1 and the RSSI at a second distance DI2 that is shorter than the first distance DI1 show different values to each other. For example, the RSSI value of the identification signal ID at a location at the second distance DI2 is higher than the RSSI value of the identification signal ID at a location at the first distance DI1.

The identification signal ID may include other distance information instead of the aforementioned RSSI. For example, in a case where the identification signal ID is of a strength such that the signal reaches as far as the second distance DI2, the identification signal ID includes a close-range identifier "IMMEDIATE", and in a case where the identification signal ID is of a strength such that the signal reaches as far as the first distance DI1, the identification signal ID includes a medium-range identifier "NEAR". In this case also, the identification signal ID can include distance information.

Upon receiving the identification signal ID, the portable terminal 200 includes the distance information included in the identification signal in the response signal RE, and transmits the response signal RE.

The electric power control apparatus 11 also includes a distance determining unit 117. Based on the distance information included in the response signal RE, without any operation by the rider, who carries the portable terminal 200, on the motorcycle 100 or the portable terminal 200, the distance determining unit 117 determines whether the distance between the portable terminal 200 and the motorcycle 100 is not more than the first distance DI1, or is not more than the second distance DI2 that is shorter than the first distance DI1. Here, the phrase "the distance between the portable terminal 200 and the motorcycle 100 is not more than the first distance DI1" means that the distance is more than the second distance DI2 and is not more than the first distance DI1.

If the distance determining unit 117 determines that the distance between the portable terminal 200 and the motorcycle 100 is not more than the first distance DI1, the command unit 113 commands current conduction in the first electric power supply circuit 13, and does not command current conduction in the second electric power supply circuit 14. By this means, the first electric power supply circuit 13 supplies electric power to the electronic device 30, and the electronic device 30 receives the electric power and starts an activation process. Further, when the distance determining unit 117 determines that the distance between the portable terminal 200 and the motorcycle 100 is not more than the second distance DI2 that is closer to the motorcycle 100 than the first distance DI1, the command unit 113 commands current conduction in the second electric power supply circuit. By this means, the second electric power supply circuit 14 supplies electric power to the driving force control apparatus 12, and the driving force control apparatus 12 receives the electric power and starts an activation process. At this time, the command unit 113 performs the aforementioned operations without any operation by the rider, who carries the portable terminal 200, on the motorcycle 100 or the portable terminal 200.

By means of the above described operations, if the rider performs an action of approaching the motorcycle 100, the electronic device 30 starts an activation process in advance when the rider is within the first distance DI1 (and outside the second distance DI2), and activation of the driving force control apparatus 12 is started when the rider is within the second distance DI2 that is closer to the motorcycle 100 than the first distance DI1. Thus, not only can a time period from when the rider reaches the motorcycle 100 until the electronic device 30 enters a usable state be shortened, but a time period until the motorcycle 100 enters the travel-enabled state can also be shortened. In addition, by starting activation of the driving force control apparatus 12 when the rider is within the second distance DI2 that is closer the motorcycle 100 than the first distance DI1, the occurrence of a situation in which a third party other than the rider gets on the motorcycle 100 and unlocks a handle lock and/or starts up the driving force generating apparatus EU or the like before the rider reaches the motorcycle 100 can be inhibited.

Hereinafter, beacon transmission processing and in-advance electric power supply processing in the electric power control apparatus 11 as well as portable terminal response processing in the portable terminal 200 that are performed in the present embodiment are described in detail.

[Beacon Transmission Processing]

The beacon transmission processing in the third embodiment is the same as the processing in FIG. 5 of the first embodiment. That is, referring to FIG. 5, each time the predetermined time period Δt elapses (Yes in S2), the identification signal transmission unit 111 in the electric power control apparatus 11 transmits the identification signal ID in all directions with respect to a planar view of the motorcycle 100 (S1). Note that, as described above, the identification signal transmission unit 111 automatically transmits the identification signal ID. That is, the identification signal transmission unit 111 autonomously transmits the identification signal ID, without any operation by the rider on the motorcycle 100 or the portable terminal 200. Note that, in the present embodiment, the identification signal transmission unit 111 transmits the identification signal ID that includes the aforementioned distance information.

[Portable Terminal Response Processing]

Figure 12:
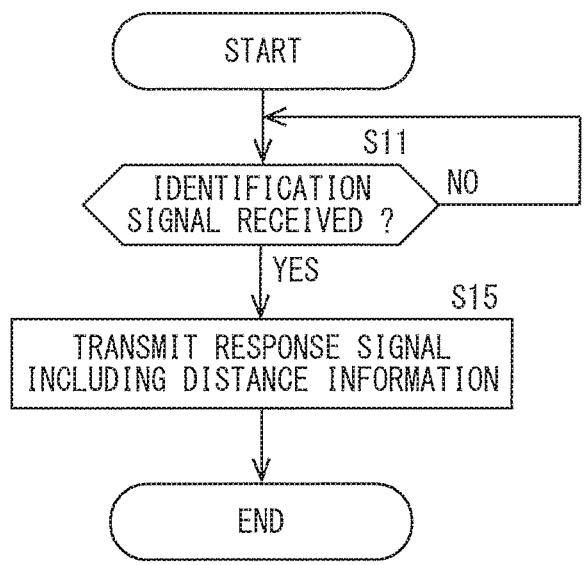
FIG. 12 is an operation flowchart of portable terminal response processing by a portable terminal shown in FIG. 11.

FIG. 12 is an operation flowchart of portable terminal response processing performed by the portable terminal 200. Referring to FIG. 12, when the portable terminal 200 receives the identification signal ID that is transmitted intermittently (S11), the portable terminal 200 transmits the response signal RE to the motorcycle 100 (S15). As described above, in the portable terminal 200, the portable terminal response processing program that is stored in advance in the memory 202 is operating. Furthermore, in the portable terminal 200, information (identification signal ID information) relating to the identification signal ID that is unique to the identification signal transmission unit 111 in the electric power control apparatus 11 of the motorcycle 100 is stored in the memory 202. When the received identification signal ID corresponds to the identification signal ID information stored in the memory 202, the portable terminal 200 transmits the response signal RE.

At this time, the portable terminal 200 also includes the distance information that is included in the received identification signal ID in the response signal RE, and transmits the response signal RE (S15). Note that, the portable terminal 200 performs the aforementioned operations without any operation by the rider on the motorcycle 100 or the portable terminal 200. In this case, with respect to S11 and S15, the phrase "without any operation by the rider on the motorcycle 100 or the portable terminal 200" means that when the portable terminal 200 performs the aforementioned operations, the rider does not operate a physical key or a software key or the like of the portable terminal 200 and does not operate a physical key or a software key or the like of the motorcycle 100.

[In-Advance Electric Power Supply Processing]

Figure 13:
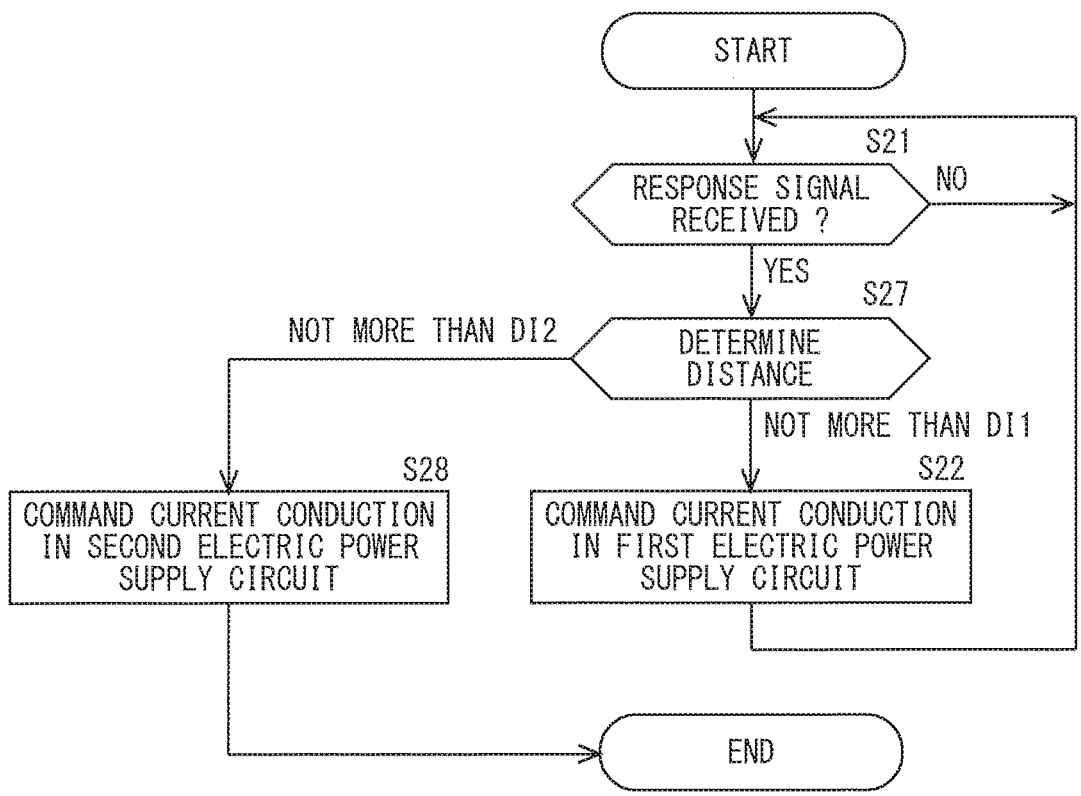
FIG. 13 is an operation flowchart of in-advance electric power supply processing by an electric power control apparatus shown in FIG. 11.

FIG. 13 is an operation flowchart of in-advance electric power supply processing by the electric power control apparatus 11. Referring to FIG. 13, when the response signal RE is transmitted from the portable terminal 200, the response signal reception unit 112 inside the electric power control apparatus 11 receives the response signal RE (Yes in S21). At this time, the response signal reception unit 112 receives the aforementioned response signal RE without any operation by the rider on the motorcycle 100 or the portable terminal 200.

After the response signal reception unit 112 receives the response signal RE, the distance determining unit 117 determines the distance between the portable terminal 200 and the motorcycle 100 based on the distance information included in the response signal RE (S27). At this time, the distance determining unit 117 executes the aforementioned determination without any operation by the rider on the motorcycle 100 or the portable terminal 200.

When the distance determining unit 117 determines that the distance between the portable terminal 200 and the motorcycle 100 is not more than the first distance DI1, the command unit 113 commands current conduction in the first electric power supply circuit 13 without commanding current conduction in the second electric power supply circuit 14 (S22), without any operation by the rider on the motorcycle 100 or the portable terminal 200. By this means, the first electric power supply circuit 13 supplies electric power of the electric power source 20 to the electronic device 30, without any operation by the rider on the motorcycle 100 or the portable terminal 200. As a result, the electronic device 30 receives a supply of electric power and starts an activation process.

When the rider carrying the portable terminal 200 moves closer to the motorcycle 100 and enters within the second distance DI2, the portable terminal 200 transmits a response signal RE that includes distance information corresponding to the distance DI2 without any operation by the rider on the motorcycle 100 or the portable terminal 200 (S15).

At this time, the response signal reception unit 112 of the electric power control apparatus 11 receives the response signal RE without any operation by the rider on the motorcycle 100 or the portable terminal 200 (S21). Based on the distance information in the response signal RE that is received, the distance determining unit 117 determines that the distance between the portable terminal 200 and the motorcycle 100 is not more than the second distance DI2, without any operation by the rider on the motorcycle 100 or the portable terminal 200 (S27). At this time, without any operation by the rider on the motorcycle 100 or the portable terminal 200, the command unit 113 commands current conduction in the second electric power supply circuit 14 (S28). By this means, without any operation by the rider on the motorcycle 100 or the portable terminal 200, the second electric power supply circuit 14 supplies electric power of the electric power source 20 to the driving force control apparatus 12. Therefore, the driving force control apparatus 12 receives a supply of electric power and starts an activation process.

By means of the above described operations, if the rider performs an action of approaching the motorcycle 100, the electronic device 30 starts an activation process in advance when the rider is within the first distance DI1, and activation of the driving force control apparatus 12 is started when the rider is within the second distance DI2 that is closer to the motorcycle 100 than the first distance DI1. Thus, not only can a time period from when the rider reaches the motorcycle 100 until the electronic device 30 enters a usable state be shortened, but a time period until the motorcycle 100 enters the travel-enabled state can also be shortened. In addition, by starting activation of the driving force control apparatus 12 when the rider is within the second distance DI2 that is closer to the motorcycle 100 than the first distance DI1, the occurrence of a situation in which a third party other than the rider gets on the motorcycle 100 and unlocks a handle lock and/or starts up the driving force generating apparatus EU or the like before the rider reaches the motorcycle 100 can be inhibited.

Fourth Embodiment

According to the fourth embodiment, the security is further increased relative to the third embodiment, in a similar manner to the second embodiment.

Figure 14:
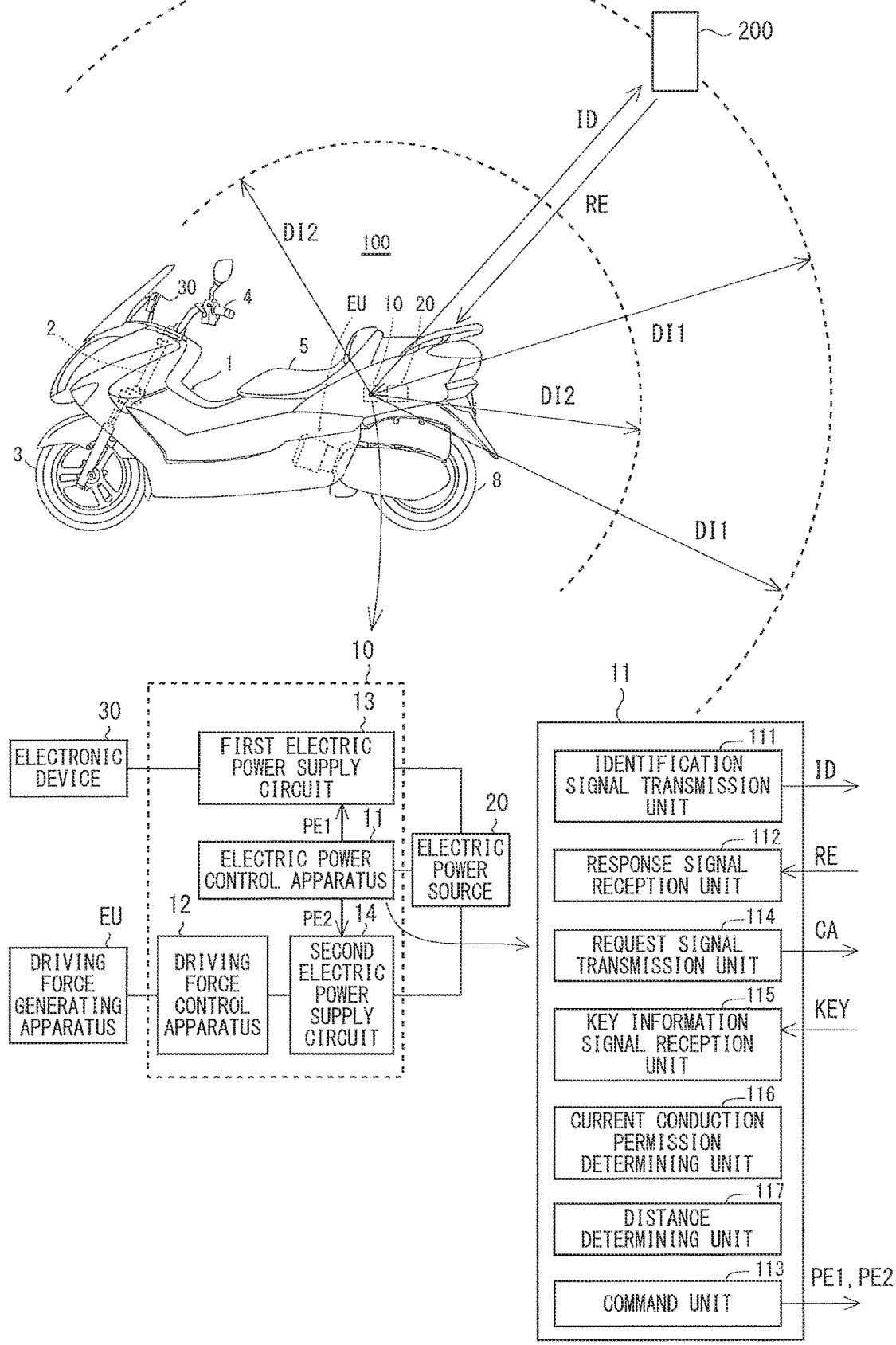
FIG. 14 is a schematic diagram showing the overall configuration of an open-cabin vehicle according to a fourth embodiment.

FIG. 14 is a schematic diagram illustrating the configuration of an open-cabin vehicle (motorcycle) according to the fourth embodiment. Referring to FIG. 14, in the fourth embodiment the configuration of the electric power control apparatus 11 is different in comparison to the third embodiment illustrated in FIG. 11.

Similarly to FIG. 11, the electric power control apparatus 11 includes the identification signal transmission unit 111, the response signal reception unit 112, the command unit 113 and the distance determining unit 117.

The electric power control apparatus 11 also includes the request signal transmission unit 114. In response to reception of the response signal RE from the portable terminal 200, the request signal transmission unit 114 transmits to the portable terminal 200 a request signal CA requesting transmission of a signal including the key information KEY, without any operation by the rider, who carries the portable terminal 200, on the motorcycle 100 or the portable terminal 200.

The electric power control apparatus 11 also includes the key information signal reception unit 115. The key information signal reception unit 115 receives a key information signal that includes the key information KEY which is transmitted from the portable terminal 200, without any operation by the rider, who carries the portable terminal 200, on the motorcycle 100 or the portable terminal 200. In this case, the key information KEY is a unique ID code. The portable terminal 200 stores the key information KEY that corresponds to the key information (ID code) stored in the electric power control apparatus 11, in advance in the memory 202 or the like. The key information KEY is stored, for example, in a portable terminal response program.

The electric power control apparatus 11 further includes a current conduction permission determining unit 116. Based on the key information KEY received by the key information signal reception unit 115, the current conduction permission determining unit 116 determines whether or not to permit current conduction in the first electric power supply circuit 13 or the second electric power supply circuit 14, without any operation by the rider, who carries the portable terminal 200, on the motorcycle 100 or the portable terminal 200. Specifically, the current conduction permission determining unit 116 electronically compares the key information KEY received by the key information signal reception unit 115 and the key information that is stored in advance in the electric power control apparatus 11, and determines whether or not the received key information KEY and the key information stored in the electric power control apparatus 11 match. When the received key information KEY and the key information stored in the electric power control apparatus 11 match, the current conduction permission determining unit 116 permits current conduction in the first electric power supply circuit 13 or the second electric power supply circuit 14.

In the present embodiment, when the current conduction permission determining unit 116 permits current conduction, based on the distance information included in the response signal RE, without any operation by the rider, who carries the portable terminal 200, on the motorcycle 100 or the portable terminal 200, the distance determining unit 117 determines whether the distance between the portable terminal 200 and the motorcycle 100 is not more than the first distance DI1, or is not more than the second distance DI2 that is shorter than the first distance DI1.

When the current conduction permission determining unit 116 permits current conduction and the distance determining unit 117 determines that the distance between the portable terminal 200 and the motorcycle 100 is not more than the first distance DI1, the command unit 113 commands current conduction in the first electric power supply circuit 13, and does not command current conduction in the second electric power supply circuit 14. Thus, the first electric power supply circuit 13 supplies electric power to the electronic device 30, and the electronic device 30 receives the electric power and starts an activation process. Further, when the current conduction permission determining unit 116 permits current conduction and the distance determining unit 117 determines that the distance between the portable terminal 200 and the motorcycle 100 is not more than the second distance DI2, the command unit 113 commands current conduction in the second electric power supply circuit 14. Thus, the second electric power supply circuit 14 supplies electric power to the driving force control apparatus 12, and the driving force control apparatus 12 receives the electric power and starts an activation process. At this time, the command unit 113 performs the aforementioned operations without any operation by the rider, who carries the portable terminal 200, on the motorcycle 100 or the portable terminal 200.

By means of the above described operations, if the rider performs an action of approaching the motorcycle 100, the electronic device 30 starts an activation process in advance when the rider is within the first distance DI1 (and outside the second distance DI2), and activation of the driving force control apparatus 12 is started when the rider is within the second distance DI2 that is closer to the motorcycle 100 than the first distance DI1. Thus, not only can a time period from when the rider reaches the motorcycle 100 until the electronic device 30 enters a usable state be shortened, but a time period until the motorcycle 100 enters the travel-enabled state can also be shortened. In addition, by starting activation of the driving force control apparatus 12 when the rider is within the second distance DI2 that is closer to the motorcycle 100 than the first distance DI1, the occurrence of a situation in which a third party other than the rider gets on the motorcycle 100 and unlocks a handle lock and/or starts up the driving force generating apparatus EU or the like before the rider reaches the motorcycle 100 can be inhibited. In addition, because key authentication that is based on key information is performed, the security of the above described processing operations can be increased.

Hereinafter, beacon transmission processing and in-advance electric power supply processing in the electric power control apparatus 11 as well as portable terminal response processing in the portable terminal 200 that are performed in the present embodiment are described in detail.

[Beacon Transmission Processing]

The beacon transmission processing in the fourth embodiment is the same as in the third embodiment. That is, referring to FIG. 5, each time the predetermined time period Δt elapses (Yes in S2), the identification signal transmission unit 111 in the electric power control apparatus 11 transmits the identification signal ID in all directions with respect to the motorcycle 100 (S1). Note that, as described above, the identification signal transmission unit 111 automatically transmits the identification signal ID. That is, the identification signal transmission unit 111 autonomously transmits the identification signal ID, without any operation by the rider on the motorcycle 100 or the portable terminal 200. However, in the present embodiment, similarly to the third embodiment, the identification signal transmission unit 111 transmits the identification signal ID that includes the aforementioned distance information.

[Portable Terminal Response Processing and in-Advance Electric Power Supply Processing]

Figure 15:
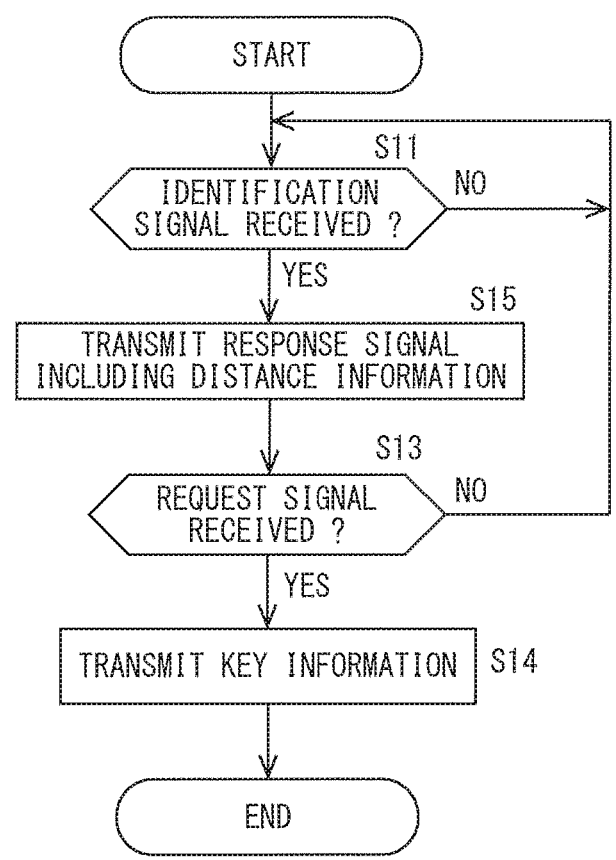
FIG. 15 is an operation flowchart of portable terminal response processing by a portable terminal shown in FIG. 14.
Figure 16:
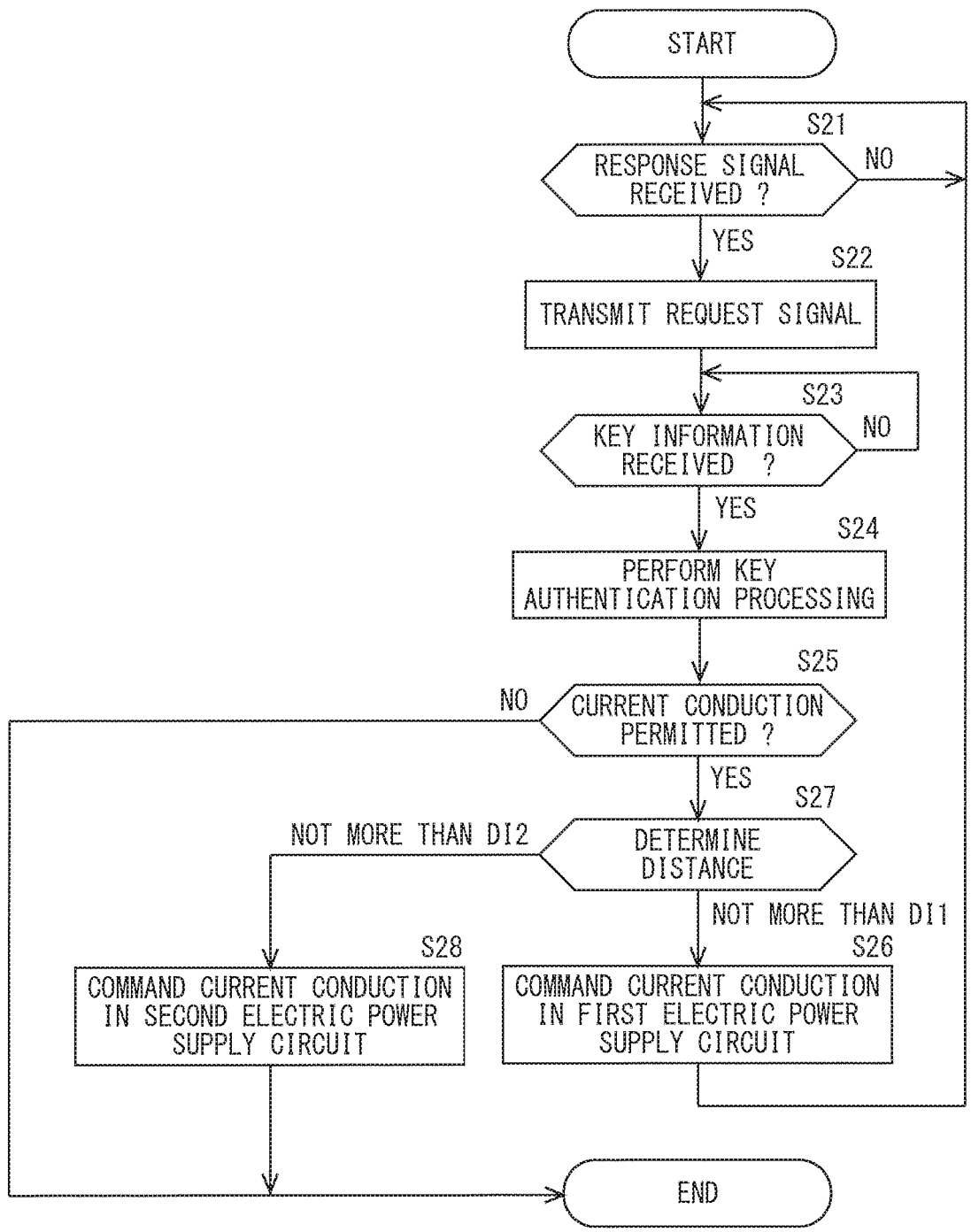
FIG. 16 is an operation flowchart of in-advance electric power supply processing by an electric power control apparatus shown in FIG. 14.

FIG. 15 is an operation flowchart of portable terminal response processing in the portable terminal 200. FIG. 16 is an operation flowchart of in-advance electric power supply processing in the electric power control apparatus 11.

Referring to FIG. 15 and FIG. 16, when the portable terminal 200 receives the identification signal ID that was transmitted from the identification signal transmission unit 111 by the beacon transmission processing (S11), the portable terminal 200 transmits the response signal RE to the motorcycle 100 without an operation being performed by the rider on the motorcycle 100 or the portable terminal 200 (S15). At this time, the portable terminal 200 includes the distance information that is included in the identification signal ID in the response signal RE, and transmits the response signal RE (S15).

The response signal reception unit 112 inside the electric power control apparatus 11 of the motorcycle 100 receives the response signal RE from the portable terminal 200 without an operation being performed by the rider on the motorcycle 100 or the portable terminal 200 (Yes in S21).

In response to reception of the response signal RE by the response signal reception unit 112, the request signal transmission unit 114 transmits, to the portable terminal 200, the request signal CA requesting transmission of a signal including the key information KEY, without an operation being performed by the rider on the motorcycle 100 or the portable terminal 200 (S22).

The portable terminal 200 receives the request signal CA without an operation being performed by the rider on the motorcycle 100 or the portable terminal 200 (Yes in S13). In response to the request signal CA that is received, the portable terminal 200 transmits a key information signal including the key information KEY that is stored in advance in the memory 202 to the motorcycle 100, without an operation being performed by the rider on the motorcycle 100 or the portable terminal 200 (S14).

The key information signal reception unit 115 inside the electric power control apparatus 11 of the motorcycle 100 receives the signal including the key information KEY (Yes in S23), without an operation being performed by the rider on the motorcycle 100 or the portable terminal 200. At such time, the current conduction permission determining unit 116 inside the electric power control apparatus 11 executes key authentication processing without an operation being performed by the rider on the motorcycle 100 or the portable terminal 200 (S24).

In the key authentication processing, based on the key information KEY that was received in step S23, without any operation by the rider, who carries the portable terminal 200, on the motorcycle 100 or the portable terminal 200, the current conduction permission determining unit 116 determines whether or not to permit current conduction in the first electric power supply circuit 13 or the second electric power supply circuit 14. The determination method is not particularly limited. For example, the key authentication processing that the current conduction permission determining unit 116 executes may be immobilizer authentication or may be another known authentication method. As one example, as described above, the current conduction permission determining unit 116 of the electric power control apparatus 11 determines whether or not the key information stored in the memory 104 and the key information KEY transmitted from the portable terminal 200 match.

If the current conduction permission determining unit 116 cannot authenticate the key information KEY (No in S25), the processing operation of the electric power control apparatus 11 ends. In contrast, if the key information KEY could be authenticated, the current conduction permission determining unit 116 permits current conduction in the first electric power supply circuit 13 or the second electric power supply circuit 14 (Yes in S25).

When the current conduction permission determining unit 116 permits current conduction (Yes in S25), based on the response signal RE received in step S21, the distance determining unit 117 determines whether the distance between the portable terminal 200 and the motorcycle 100 is not more than the first distance DI1, or is not more than the second distance DI2 (S27). In a case where the distance determining unit 117 determines that the distance between the portable terminal 200 and the motorcycle 100 is not more than the first distance DI1, the command unit 113 commands current conduction in the first electric power supply circuit 13 without commanding current conduction in the second electric power supply circuit 14 (S26), without any operation by the rider on the motorcycle 100 or the portable terminal 200. By this means, the first electric power supply circuit 13 supplies electric power of the electric power source 20 to the electronic device 30, without any operation by the rider on the motorcycle 100 or the portable terminal 200. As a result, the electronic device 30 receives a supply of electric power and starts an activation process.

In addition, when the rider carrying the portable terminal 200 moves closer to the motorcycle 100 and enters within the second distance DI2, the portable terminal 200 transmits a response signal RE that includes distance information corresponding to the distance DI2 without any operation by the rider on the motorcycle 100 or the portable terminal 200 (S15).

In this case, when the current conduction permission determining unit 116 permits current conduction (Yes in S25), based on the distance information in the response signal RE that is received, the distance determining unit 117 determines that the distance between the portable terminal 200 and the motorcycle 100 is not more than the second distance DI2, without any operation by the rider on the motorcycle 100 or the portable terminal 200 (S27). At this time, without any operation by the rider on the motorcycle 100 or the portable terminal 200, the command unit 113 commands current conduction in the second electric power supply circuit 14 (S28). By this means, without any operation by the rider on the motorcycle 100 or the portable terminal 200, the second electric power supply circuit 14 supplies electric power of the electric power source 20 to the driving force control apparatus 12. Therefore, the driving force control apparatus 12 receives a supply of electric power and starts an activation process.

Note that, in FIG. 16, after the current conduction permission determining unit 116 performs key authentication (S24 and S25), the distance determining unit 117 performs a determination with respect to the distance (S27). However, the present teaching is not limited thereto. The determination by the current conduction permission determining unit 116 may be performed after the determination by the distance determining unit 117. In either case, when the current conduction permission determining unit 116 permits current conduction and the distance determining unit 117 determines that the distance between the portable terminal 200 and the motorcycle 100 is not more than the first distance DI1, the command unit 113 commands current conduction in the first electric power supply circuit 13, without commanding current conduction in the second electric power supply circuit 14. Further, when the current conduction permission determining unit 116 permits current conduction and the distance determining unit 117 determines that the distance between the portable terminal 200 and the motorcycle 100 is not more than the second distance DI2, the command unit 113 commands current conduction in the second electric power supply circuit 14.

By means of the above described operations, if the rider performs an action of approaching the motorcycle 100, the electronic device 30 starts an activation process in advance when the rider is within the first distance DI1, and activation of the driving force control apparatus 12 is started when the rider is within the second distance DI2 that is closer to the motorcycle 100 than the first distance DI1. Thus, not only can a time period from when the rider reaches the motorcycle 100 until the electronic device 30 enters a usable state be shortened, but a time period until the motorcycle 100 enters the travel-enabled state can also be shortened. In addition, by starting activation of the driving force control apparatus 12 when the rider is within the second distance DI2 that is closer to the motorcycle 100 than the first distance DI1, the occurrence of a situation in which a third party other than the rider gets on the motorcycle 100 and unlocks a handle lock and/or starts up the driving force generating apparatus EU or the like before the rider reaches the motorcycle 100 can be inhibited. In addition, because key authentication is performed in the in-advance electric power supply processing, the security can be increased.

The aforementioned first distance DI1 and second distance DI2 can be appropriately decided based on conditions such as determining distances in accordance with the kind and size of the open-cabin vehicle that is represented by the motorcycle 100 (for example, determining a distance that facilitates prevention of the occurrence of a situation in which the motorcycle 100 is operated by a third party), or so that a rider is not liable to feel dissatisfaction with respect to the activation timing of the electronic device 30 and the driving force control apparatus 12.

Embodiments of the present teaching have been described above. However, the embodiments described above are merely examples for implementing the present teaching.

Accordingly, the present teaching is not limited to the above embodiments, and the above embodiments can be appropriately modified and implemented without departing from the gist of the present teaching.

A location at which to dispose the control apparatus 10 that includes the electric power control apparatus 11 is not limited to the location illustrated in FIG. 1, FIG. 8, FIG. 11 and FIG. 14. The mounting position of the control apparatus 10 that includes the electric power control apparatus 11 is not particularly limited as long as the control apparatus 10 is mounted in the open-cabin vehicle that is represented by the motorcycle 100. A location at which to dispose the electronic device 30 is also not limited to the location illustrated in FIG. 1, FIG. 8, FIG. 11 and FIG. 14. The mounting position of the electronic device 30 is not particularly limited as long as the electronic device 30 is mounted in the open-cabin vehicle that is represented by the motorcycle 100.

Further, it is possible to download information relating to the key information KEY inside the portable terminal 200 or the identification signal ID to the portable terminal 200 via an unshown server. Therefore, for example, in a case where the rider loses the portable terminal 200 or in a case where the motorcycle 100 is lent to a friend or the like, the above described portable terminal response processing can be executed by downloading information relating to the key information KEY and the identification signal ID to another portable terminal that is different from the portable terminal 200.

In the foregoing embodiments, when the driving force control apparatus 12 starts an activation process, release of a handle lock and activation of the driving force control apparatus 12 may be executed simultaneously.

The terminology used herein is for the purpose of describing particular embodiments only and is not intended to be limiting of the teaching.

REFERENCE SIGNS LIST

11 Electric Power Control Apparatus
12 Driving Force Control Apparatus
13 First Electric Power Supply Circuit
14 Second Electric Power Supply Circuit
20 Electric Power Source
30 Electronic Device
111 Identification Signal Transmission Unit
112 Response Signal Reception Unit
113 Command Unit
100 Open-cabin Vehicle
200 Portable Terminal
EU Driving Force Generating Apparatus

What is claimed is:

1. An open-cabin vehicle having a riding area that is not an enclosed space, comprising:
an electric power source;
a driving force generating apparatus configured to generate a driving force;
a driving force control apparatus configured to control the driving force generating apparatus;
a first electric power supply circuit electrically connectable to an electronic device, the first electric power supply circuit being capable of supplying electric power to the electronic device;
a second electric power supply circuit capable of supplying electric power to the driving force control apparatus; and
an electric power control apparatus configured to control current conduction and current interruption in the first electric power supply circuit, and control current conduction and current interruption in the second electric power supply circuit,
wherein the electric power control apparatus includes:
an identification signal transmission unit configured to intermittently transmit an identification signal including identifiable information, without any operation on the open-cabin vehicle or on a portable terminal configured to transmit a response signal in response to the identification signal that is intermittently transmitted;
a response signal reception unit configured to receive the response signal transmitted from the portable terminal in response to the identification signal that is intermittently transmitted; and
a command unit configured to, in response to reception of the response signal by the response signal reception unit, command current conduction in the first electric power supply circuit and not command current conduction in the second electric power supply circuit.

2. The open-cabin vehicle according to claim 1, wherein:
the portable terminal includes key information;
the electric power control apparatus further includes:
a request signal transmission unit configured to, in response to reception of the response signal by the response signal reception unit, transmit a request signal that requests the portable terminal to transmit a key information signal that includes the key information, without any operation on the open-cabin vehicle or the portable terminal,
a key information signal reception unit configured to receive the key information signal that includes the key information transmitted from the portable terminal in response to the request signal from the request signal transmission unit, and
a current conduction permission determining unit configured to determine whether or not to permit current conduction based on the key information signal that is received by the key information signal reception unit; and
in response to the current conduction permission determining unit permitting current conduction, the command unit commands current conduction in the first electric power supply circuit and does not command current conduction in the second electric power supply circuit.

3. The open-cabin vehicle according to claim 2, wherein:
the response signal includes distance information relating to a distance between the portable terminal and the open-cabin vehicle;
the electric power control apparatus further includes:
a distance determining unit configured to, based on the response signal including the distance information, determine whether the distance between the portable terminal and the open-cabin vehicle is not more than a first distance or is not more than a second distance that is shorter than the first distance; and
the command unit is configured to:
command current conduction in the first electric power supply circuit and not command current conduction in the second electric power supply circuit in response to the current conduction permission determining unit permitting current conduction and the distance determining unit determining that the distance between the portable terminal and the open-cabin vehicle is not more than the first distance; and command current conduction in the second electric power supply circuit in response to the current conduction permission determining unit permitting current conduction and the distance determining unit determining that the distance between the portable terminal and the open-cabin vehicle is not more than the second distance that is shorter than the first distance.

4. The open-cabin vehicle according to claim 1, wherein:
the response signal includes distance information relating to a distance between the portable terminal and the open-cabin vehicle;
the electric power control apparatus further includes:
a distance determining unit configured to, based on the response signal including the distance information, determine whether the distance between the portable terminal and the open-cabin vehicle is not more than a first distance or is not more than a second distance that is shorter than the first distance; and
the command unit is configured to:
command current conduction in the first electric power supply circuit and not command current conduction in the second electric power supply circuit in response to the distance determining unit determining that the distance between the portable terminal and the open-cabin vehicle is not more than the first distance, and
command current conduction in the second electric power supply circuit in response to the distance determining unit determining that the distance between the portable terminal and the open-cabin vehicle is not more than the second distance that is shorter than the first distance.

* * * * *